United States Patent [19]
Taniguchi et al.

[11] Patent Number: 5,846,155
[45] Date of Patent: Dec. 8, 1998

[54] VEHICULAR DRIVE UNIT

[75] Inventors: Takao Taniguchi; Shoichi Miyagawa, both of Okazaki; Kazumasa Tsukamoto, Toyota; Shigeo Tsuzuki, Takahama; Satoru Tanaka, Nishio; Takeshi Inuzuka; Masashi Hattori, both of Anjo; Takeshi Hara, Chiryu, all of Japan

[73] Assignee: Aisin AW Co., Ltd., Anjo, Japan

[21] Appl. No.: 684,934

[22] Filed: Jul. 19, 1996

[30] Foreign Application Priority Data

Jul. 19, 1995 [JP] Japan .................................... 7-183116

[51] Int. Cl.$^6$ ................................ B60K 6/00; F16H 3/72
[52] U.S. Cl. .................................. 477/2; 475/5; 180/65.2
[58] Field of Search ................... 475/1, 2, 5, 10, 475/207, 210, 214, 215; 180/65.2, 65.6; 477/2, 4

[56] References Cited

U.S. PATENT DOCUMENTS

| | | | |
|---|---|---|---|
| 558,175 | 9/1896 | Sherman | 180/65.2 |
| 3,732,751 | 5/1973 | Berman et al. | 180/65.2 |
| 5,258,651 | 11/1993 | Sherman | 180/65.4 X |
| 5,285,111 | 2/1994 | Sherman | 180/65.2 |
| 5,343,970 | 9/1994 | Severinsky | 180/65.6 X |
| 5,558,588 | 9/1996 | Schmidt | 180/65.2 X |
| 5,643,119 | 7/1997 | Yamaguchi et al. | 475/5 |

FOREIGN PATENT DOCUMENTS 445873  9/1991  European Pat. Off. .............. 180/65.2

3245045  6/1984  Germany ............................... 180/65.2

OTHER PUBLICATIONS

Autoweek, "Road Sailing", By Pete Lyons, pp. 15–17, Aug. 11, 1997.

Autoweek, "One For The Faithful", pp. 18–19, Aug. 11, 1997.

Autoweek, "The Future Comes Silently Upon Us", pp. 20–21, Aug. 11, 1997.

SAE Paper 0098–2571/81/8909–0081, "Electric Vehicle CVTs Evaluated", pp. 81–88, Sep. 1981.

*Primary Examiner*—Khoi Q. Ta
*Attorney, Agent, or Firm*—Oliff & Berridge, PLC

[57] ABSTRACT

A vehicular drive unit having a combustion engine, a motor-generator for converting electric energy coming from a battery into mechanical energy to output the converted mechanical energy or for converting mechanical energy into electrical energy to store the converted electrical energy in the battery, and a planetary gear including at least three rotary elements. The vehicular drive unit further includes a continuously variable transmission for changing the revolution of an input member continuously variably to output the changed revolution to the drive wheels of the vehicle. The planetary gear has a first rotary element connected to the output shaft of the combustion engine, a secondary element acting in reaction against the first rotary element and connected to the motor-generator, and a third rotary element connected to the input member of the continuously variable transmission.

26 Claims, 17 Drawing Sheets

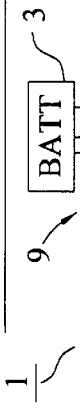
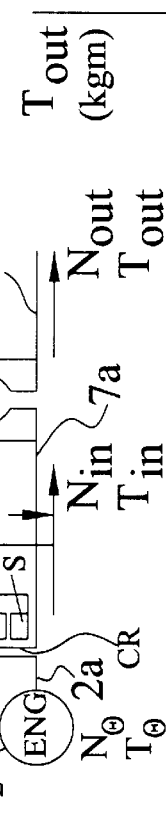
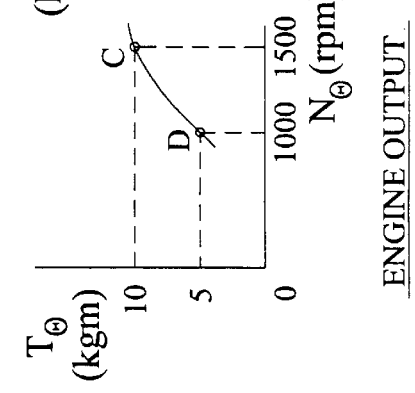
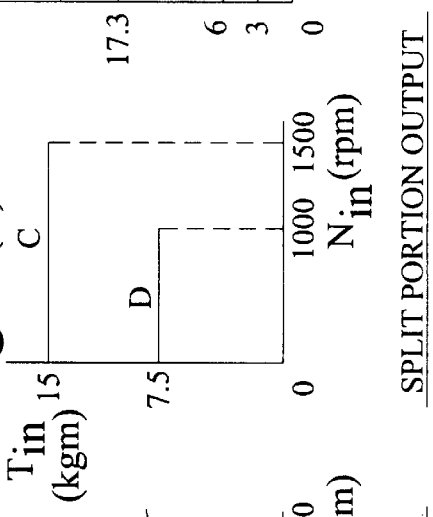
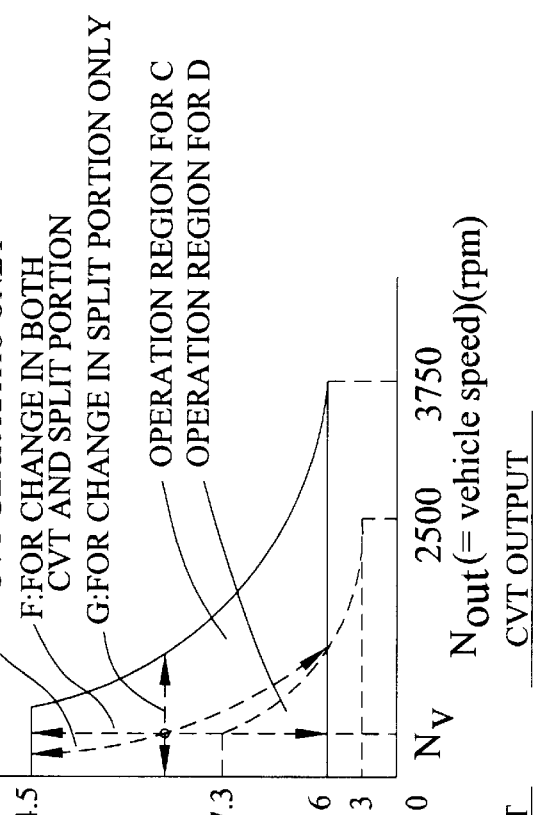

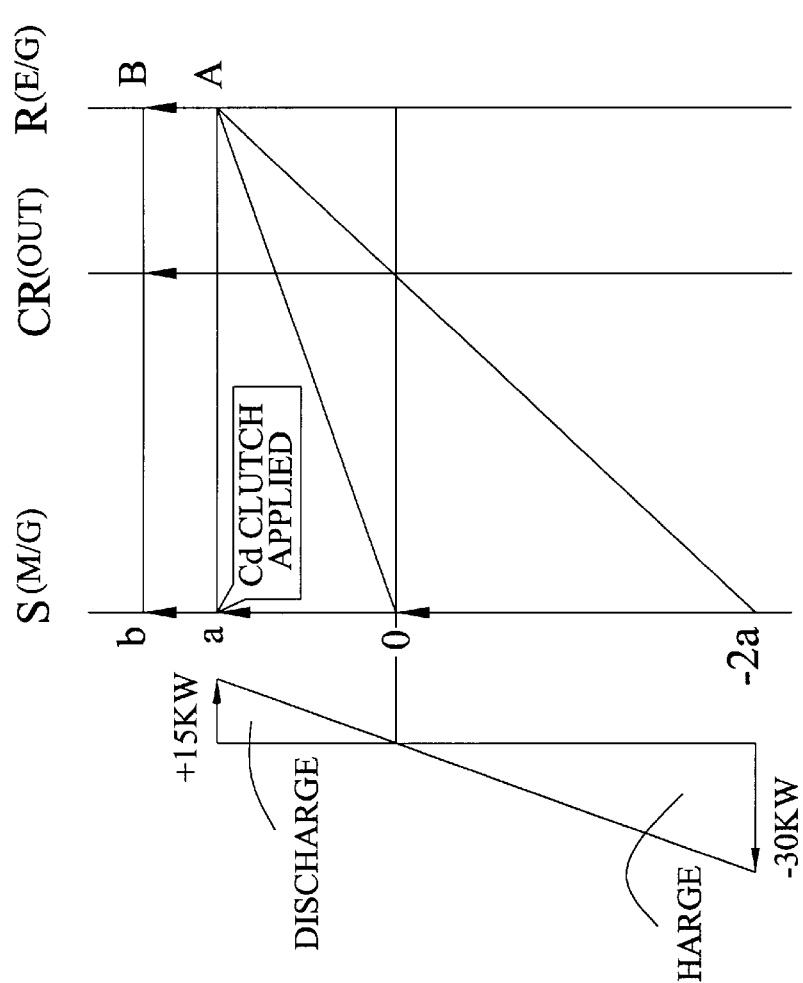
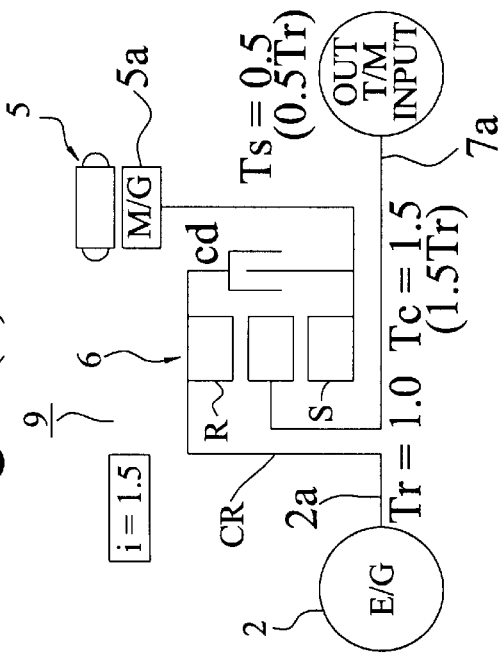
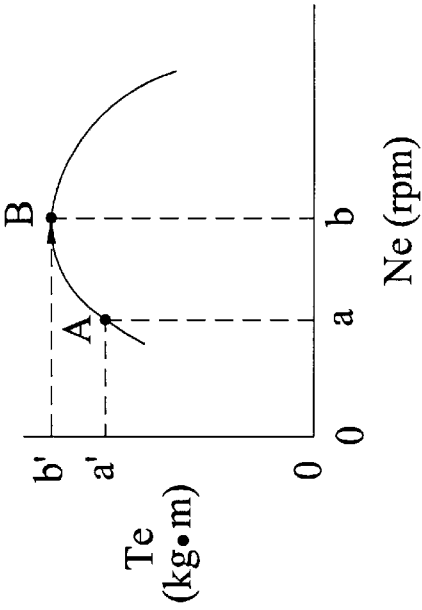

Fig. 6

|  | Ci | Cd | Br | M/G OPERATIONS |
|---|---|---|---|---|
| POWER SPLIT MODE | ○ | × | × | USED AS MOTOR AND GENERATOR |
| PARALLEL HYBRID MODE | ○ | ○ | × | ↑ |
| MOTOR MODE | × | ○ | × | DRIVING AS MOTOR |
| ENGINE MODE | ○ | ○ | × | NO OPERATION |
| REGENERATING BRAKING MODE | × | ○ | × | CONVERTING VEHICULAR INERTIAL ENERGY TO ELEC. PWR. |
| REVERSE MODE | × | × | ○ | REVERSING M/G (THROUGH SUN GEAR) |

Fig. 7

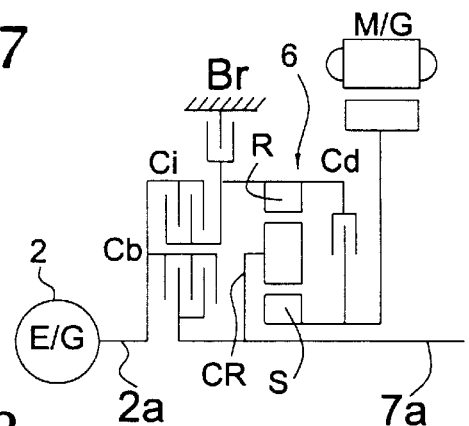

Fig. 8

|  | Ci | Cd | Cb | Br |
|---|---|---|---|---|
| POWER SPLIT MODE | ○ | × | × | × |
| PARALLEL HYBRID MODE | × | × | ○ | ○ |
| MOTOR MODE | × | ○ | × | × |
| ENGINE MODE | × | × | ○ | × |
| REGENERATING BRAKING MODE | × | ○ | × | × |
| REVERSE MODE | × | × | × | ○ |

GENERATING

REVERSE MODE PROCESSING FLOW CHART 5,846,155

VEHICULAR DRIVE UNIT

BACKGROUND OF THE INVENTION

1. Field of the Invention

The invention relates to a drive unit for a vehicle, such as an automobile and, more particularly, to a vehicular drive unit including a combustion engine, such as a gasoline or diesel engine, and an electric motor-generator operated based on the electric energy of a battery, the motor-generator functioning as a buffer to absorb fluctuations in the drive power necessary for the drive of the vehicle.

2. Description of Related Art

In recent years, the goals have been to enhance, or improve, the fuel consumption rate (or mileage) and to clean the exhaust gases (or combustion gases). A variety of devices, such as a continuously variable transmission (or a vehicle mounting it) and a hybrid vehicle, have been proposed.

A vehicle using a belt type, or toroidal type, continuously variable transmission (as will be called "CVT") as the transmission, slips at its start, until the direct-coupling is achieved, because it contains a hydraulic power transmission or an electromagnetic power clutch, so that the engine power is partially lost. During travel, especially in a low load region, the engine finds it difficult to trace the optimum mileage curve. In response to a demand for a slight acceleration, moreover, the injection of fuel is increased for a change in the throttle opening. At the time of braking, still moreover, the inertial energy of the vehicle cannot be absorbed. Thus, a further demand for improved mileage and cleaner exhaust gases is not sufficiently satisfied.

A kind of hybrid vehicle is disclosed in U.S. Pat. No. 5,285,111 and U.S. Pat. No. 3,732,751, for example. According to these proposals, the vehicle includes an engine, a motor-generator and a planetary gear. At the starting time, having a heavy load on the vehicle for the engine output, for example, the motor-generator functions as energy generating means (or motor), so that the electrical energy from the battery is converted into mechanical energy to assist the engine output through the planetary gear. When the engine output is greater than the vehicle load, on the other hand, the motor-generator functions as a generator to store the excess output of the engine as electrical energy in the battery. Thus, the proposed vehicle is to have a so-called "power split train."

The vehicle can be started from, zero speed with the engine being driven, by the motor control through the planetary gear without requiring a starter, such as the hydraulic power transmission. At the braking/deceleration time, moreover, the motor can be used as a regenerative brake to store the inertial energy of the vehicle as electrical energy.

Incidentally, the aforementioned power split train is connected to a multiple-stage automatic transmission (to be called the "AT") or a manual transmission to transmit the power to the wheels.

Even when the engine is controlled in its output (i.e., the engine revolution number and the torque) along the optimum mileage curve, an abrupt fluctuation arises in the load torque at the output portion of the aforementioned power split train if a speed is stepwise changed by the AT, for example. This makes it difficult to hold the engine output in the steady state or to change it smoothly along the optimum mileage curve.

As a result, each time the gear of the AT or the like is changed, at the start of acceleration or during deceleration, the engine output may abruptly fluctuate to deteriorate the mileage and the cleanliness of the exhaust gases.

SUMMARY OF THE INVENTION

It is, therefore, an object of the invention to provide a vehicular drive unit which is constructed by using a continuously variable transmission as its transmission so that the engine output may be held in a predetermined state or slowly changed along the best mileage curve, for example, by changing the speed continuously and controlling the motor output, thereby to solve the above-specified problems.

According to a first aspect of the invention, there is provided a vehicular drive unit comprising a combustion engine; a motor-generator for converting electrical energy coming from a battery into mechanical energy to output the converted mechanical energy or for converting mechanical energy into electrical energy to store the converted electric energy in the battery; and a planetary gear including at least three rotary elements. Further, there is a continuously variable transmission for changing the revolution of an input member continuously variably to output the changed revolution to drive the wheels. The planetary gear has a first rotary element connected to the output shaft of the combustion engine, a second rotary element acting in reaction against the first rotary element and connected to the motor-generator, and a third rotary element connected to the input member of the continuously variable transmission.

According to a second aspect of the invention, there are also included a vehicle speed sensor for detecting the vehicle speed; a throttle sensor for detecting the throttle opening of the combustion engine; and a plurality of engagement means for changing the connected/fixed relationships among the first, second and third rotary elements of the planetary gear in response to the output signals coming from the vehicle speed sensor and the throttle sensor.

According to a third aspect of the invention, there is a power split mode control means for controlling the output of the motor-generator by adding or subtracting its output to or from the output of the combustion engine that is held in a predetermined state, so that the third rotary element may have a constant torque but may change its revolution number to satisfy the output required by the vehicle, and for controlling the torque ratio of the continuously variable transmission such that the revolution number of the third rotary element may satisfy the revolution number required by the vehicle.

According to a fourth aspect of the invention, further comprised of a motor mode control means for controlling the motor-generator, wherein when the vehicle speed is low and the throttle opening is small, the engagement means are so controlled that the output shaft of the combustion engine and the first rotary element may be disconnected to rotate the planetary gear together, and the motor-generator is controlled by the motor mode control means.

According to a fifth aspect of the invention, further comprising parallel hybrid mode control means for controlling the torque of the motor-generator by adding or subtracting the torque to or from the output of the combustion engine that is held in a predetermined state, so that the output required by the vehicle may be satisfied by changing the torque for a constant speed of the third rotary element, and for controlling the revolution ratio of the continuously variable transmission so that the revolution number of the third rotary element may take a predetermined value, wherein in medium and high speed ranges of the vehicle speed, the engagement means is so controlled that the planetary gear may revolve together, and the combustion engine, the motor-generator and the continuously variable transmission are controlled by the parallel hybrid mode control means.

According to a sixth aspect of the invention, there is further a parallel hybrid mode control means for controlling the torque of the motor-generator by adding or subtracting the torque to or from the output of the combustion engine that is held in a predetermined state, so that the output required by the vehicle may be satisfied by changing the torque for a constant speed of the third rotary element, and for controlling the revolution ratio of the continuously variable transmission so that the revolution number of the third rotary element may take a predetermined value, wherein in medium and high speed ranges of the vehicle speed, the engagement means are so controlled that the first rotary element of the planetary gear and the output shaft of the combustion engine may be disconnected but that the output shaft of the combustion engine may be connected to the third rotary element, and the combustion engine, the motor-generator and the continuously variable transmission are controlled by the parallel hybrid mode control means.

According to a seventh aspect of the invention, the power split or parallel hybrid mode control means controls the continuously variable transmission and the motor-generator so that the output of the combustion engine may change along the best mileage curve.

According to an eighth aspect of the invention, there is further comprised a compute means for computing an average output of the vehicle, wherein the power split train or the parallel hybrid mode control means controls the combustion engine so that the output of the vehicle may be the average output computed by the compute means.

According to a ninth aspect of the invention, there is further a residue detecting means for detecting the residue of the battery, wherein when the residue detected by the residue detecting means is within a proper range, the parallel hybrid mode control means controls the motor-generator to supplement the output of the combustion engine, if the output is lower than the vehicle output so that it is short, and to generate electric power with any excess output if the combustion engine output is higher than the vehicle output.

According to a tenth aspect of the invention, there is further a residue detecting means for detecting the residue of the battery, wherein when the residue detected by the residue detecting means is little, the parallel hybrid mode control means controls the output of the combustion engine so that the motor-generator may generate electric power.

According to an eleventh aspect of the invention, there is further a residue detecting means for detecting the residue of the battery, wherein when the residue detected by the residue detecting means is great, the parallel hybrid mode control means controls the output of the combustion engine so that the motor-generator may generate the torque.

According to a twelfth aspect of the invention, further comprising a mode select means for selecting a motor mode, in which the engagement means is controlled to disconnect the output shaft of the combustion engine and the first rotary element and to rotate the planetary gear together so that the vehicle may be driven by the motor-generator; a power split mode, in which the engagement means is controlled to rotate the first, second and third rotary elements of the planetary gear individually so that the vehicle may be driven by the combustion engine and the motor-generator; a parallel hybrid mode, in which the engagement means is controlled to rotate the output shaft of the engine and the third rotary element together so that the vehicle may be driven by the combustion engine and the motor-generator; and an engine mode, in which the engagement means are controlled to connect the first rotary element and the third rotary element of the planetary gear so that the vehicle may be driven by the combustion engine.

According to a thirteenth aspect of the invention, there is further a residue detecting means for detecting the residue of the battery, wherein the select regions of the individual mode by the select means are changed according to the residue of the battery.

According to a fourteenth aspect of the invention, there are further a reverse engagement means controlled by a forward/backward operation means; and reverse control means for causing the reverse engagement means to retain the first rotary element of the planetary gear and the engagement means to disconnect the output shaft of the combustion engine and the first rotary element thereby to output the revolution of the second rotary element by the motor-generator as a reverse revolution to the third rotary element.

According to a fifteenth aspect of the invention, there are further a deceleration detecting means for detecting the deceleration of the vehicle; and regenerative braking control means for controlling the motor-generator to convert the inertial energy of the vehicle into electrical energy on the basis of the output signal coming from the deceleration detecting means, thereby to store the converted electrical energy in the battery.

According to a sixteenth aspect of the invention, the continuously variable transmission is of the toroidal type.

According to a seventeenth aspect of the invention, the continuously variable transmission is of the belt type.

According to an eighteenth aspect of the invention, the planetary gear is a simple planetary gear, the first rotary element is a ring gear, the second rotary element is a sun gear, and the third rotary element is a carrier.

According to a nineteenth aspect of the invention, the planetary gear is a simple planetary gear, the first rotary element is a sun gear, the second rotary element is a ring gear, and the third rotary element is a carrier.

According to a twentieth aspect of the invention, the planetary gear is a double-pinion planetary gear, the first rotary element is a carrier, the second rotary element is a sun gear, and the third rotary element is a ring gear.

According to a twenty-first aspect of the invention, the planetary gear is a double-pinion planetary gear, the first rotary element is a sun gear, the second rotary element is a carrier, and the third rotary element is a ring gear.

BRIEF DESCRIPTION OF THE DRAWINGS

The invention will be described with reference to the drawings in which:

FIGS. 1(a)–1(d) show the fundamentals of an embodiment of the invention and present a skeleton structure at FIG. 1(a), an engine output diagram at FIG. 1(b), a split (drive) portion output diagram at FIG. 1(c), and a continuously variable transmission output diagram at FIG. 1(d);

FIGS. 2(a)–2(c) show a split starter (or drive unit) which can be applied to the invention and present a skeleton structure at FIG. 2(a), an engine output diagram at FIG. 2(b) and a speed diagram, including a charge/discharge diagram, at FIG. 2(c);

FIG. 6 is an operation diagram showing the operations of individual engagement means;

FIG. 7 is a skeleton structure showing a partially modified split drive unit;

FIG. 8 is an operation diagram showing the operations of the drive unit;

DESCRIPTION OF THE PREFERRED EMBODIMENTS

Figure 3:
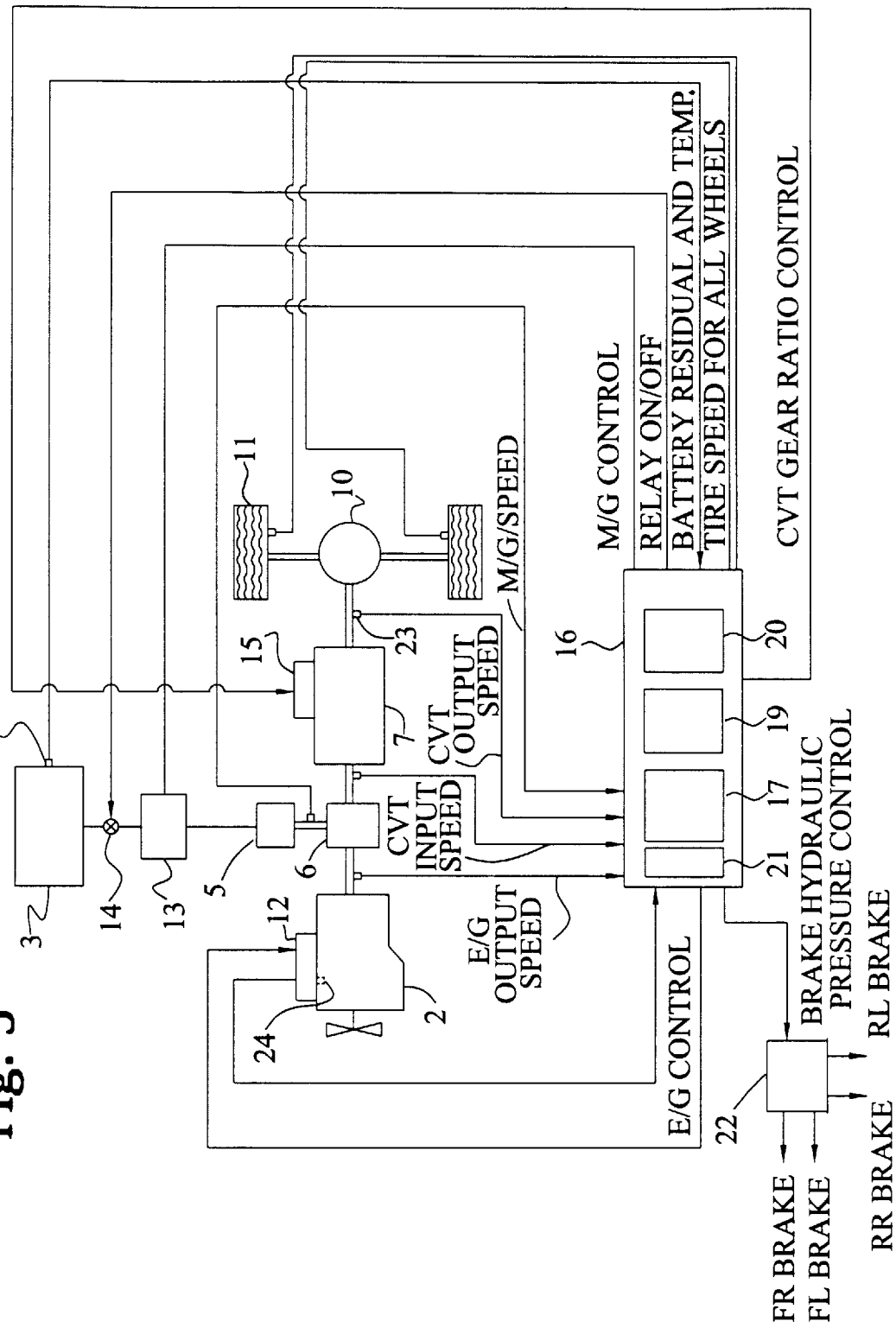
FIG. 3 is a block diagram according to the control of the embodiment.

The principle of the vehicular drive unit of the invention will be described with reference to FIG. 1. The vehicular drive unit 1, in FIG. 1(a), includes a combustion engine 2 (e.g., an internal combustion engine such as a gasoline engine), a motor-generator 5 for converting electrical energy, coming from a battery 3, into mechanical energy for output and for converting mechanical energy into electrical energy for storage in the battery 3, a planetary gear 6, and a continuously variable transmission (abbreviated to "CVT") 7. The output shaft 2a of the engine 2 is connected to a ring gear R of the planetary gear 6. A rotor 5a of the motor-generator 5 is connected to a sun gear S in a reaction relation against the ring gear R. An input shaft 7a of the continuously variable transmission 7 is connected to a carrier CR supporting a pinion gear P. An output shaft 7b of the continuously variable transmission is connected to the wheels of the vehicle. Incidentally, the engine 2, the motor-generator 5 and the planetary gear 6 constitute together a split starter (or drive unit) 9.

As shown in FIG. 2(a), the split starter 9 has a direct-coupled clutch Cd for connecting the ring gear R and the sun gear S of the planetary gear 6. The gear ratio i (=NR/NS) of the ring gear R and the sun gear S is set to 1.5. When the vehicle stands still (just before the start of movement) with the engine output shaft 7a generating an output at a revolution number Ne (a rpm) and at a torque Te (a'kg·m), as shown in FIG. 2(b), the ring gear R, connected to the engine output shaft 2a, is in position A and at a (rpm), as shown in the speed diagram of FIG. 2(c), and the carrier CR, connected to the split portion output portion or the CVT input shaft 7a, is not revolving. As a result, the sun gear S, connected to the motor-generator 5, is at −2a (rpm) for charging the motor-generator 5 with 30 KW, for example.

When the motor-generator 5 is controlled at this status to reduce the energy to be extracted to the battery, the revolution of the sun gear S approaches zero so that the revolution of the carrier CR connected to the output portion gradually increases. When the revolution of the sun gear S exceeds zero, or becomes positive, the motor-generator 5 functions as an electric motor to output (or discharge) the torque thereby to increase the revolutions of the carrier CR. As a result, the vehicle starts smoothly from zero speed even without a starter, such as a hydraulic power transmission. Further, when the revolution of the carrier CR, acting as the output portion, becomes equal to that of the ring gear R (having the revolution number A (a rpm)) which is connected to the engine output shaft 2a, the direct-coupled clutch Cd is applied to cause a parallel hybrid mode (AB) (to be described later), in which the output portion is rotated at the engine output revolution number while controlling the output torque of the motor-generator 5.

At the start (or low speed travel), moreover, the engine output, i.e., the revolution number Ne and the torque Te are held constant. The power generation of the motor-generator 5 is reduced, and the input shaft 7a of the CVT 7 or the output portion of the split portion is gradually accelerated by the assist of the motor generator 5 output. At this time, the motor-generator 5 outputs in addition (discharge) to or in subtraction (charge) from the engine output so that the split portion takes an output at a constant torque (i.e., the torque of the input shaft 7a) Tin for a revolution number Nin, as shown in FIG. 1(c). Moreover, the CVT 7 shifts the revolution of the split output portion (or the input shaft 7a), as set to the predetermined revolution number by the motor-generator 5, to a higher speed so that its output shaft 7b may take a required revolution number. According to this shift, the transmission torque changes.

In order that the output shaft 7b of the CVT 7 may take a target revolution number Nv with the engine output being held in a constant state, therefore, the CVT 7 is subjected to such a shift control that the output revolution number may be the target value, and the output of the motor-generator 5 is controlled to absorb the torque fluctuation resulting from the shift control of the CVT 7 and to supplement the excess or shortage of the engine output for the output required by the vehicle. As shown in FIG. 1(d), the shift control of the CVT 7 follows curve E because the torque changes with the change in the gear ratio, and the input shaft 7a is changed only in its revolution number, as indicated by a horizontal line G, by the motor-generator control with the torque being constant. By these two controls, the torque can be arbitrarily set within the control ranges of the CVT 7 and the motor-generator 5, as indicated by a vertical line F, while maintaining the predetermined target revolution number Nv. In other words, the output of the CVT 7 can be arbitrarily changed within the predetermined range by controlling the torque ratio of the output (at the constant torque) of the motor-generator 5 and the CVT 7, with the engine output and the CVT output (i.e., the torque Te and the revolution number Ne) being held constant.

When the engine output is at a position C (for the revolution number of 1,500 rpm and the torque of 10 Kgm), as shown in FIG. 1(b), the output shaft 7a of the split portion is at a constant value on the torque curve, as shown at position C in FIG. 1(c), and the CVT output can be set to an arbitrary position in the operation region for the point C, as shown in FIG. 1(d), by controlling the motor-generator and the CVT 7. Likewise, when the engine output is at a position D (for a revolution number of 1,000 rpm and a torque of 5 Kgm), as shown in FIG. 1(b), the CVT output can be set to an arbitrary position in the operation region for the point D. As a result, the output (i.e., the revolution number and the torque) of the CVT 7 can be arbitrarily set within the predetermined range while holding the engine output in the steady state, and can be smoothly and slowly controlled (in a quasi-steady state) along the best mileage curve, as plotted in FIG. 1(b), by changing the output of the motor-generator 5 gradually and by controlling the engine output to supplement the motor-generator output.

In FIG. 3, a schematic control diagram, the reference numeral 2 designates the combustion engine, the numeral 6 the planetary gear, the numeral 5 the motor-generator, the numeral 7 the CVT, the numeral 10 a differential unit, the numeral 11 the drive wheels. Moreover, the numeral 12 designates an engine control unit, the numeral 13 an inverter, the numeral 14 a system relay, the numeral 3 the battery, and the numeral 15 a CVT control unit. Moreover, the numeral 16 designates a vehicle control unit (ECU) including an engine control portion 17, a motor-generator control portion 19, a CVT control portion 20 and a brake control portion 21. The vehicle control unit 16 outputs control signals to the individual control units in response to the engine output revolution number (or speed), the CVT input revolution number (or speed), the CVT output revolution number (or speed), the rotor revolution number (or speed) of the motor-generator, the battery residue, the battery temperature and the tire revolution number (or speed). The numeral 22 designates a brake oil pressure control unit (or regenerative brake control portion) and actuates the individual brakes (for the individual wheels) in response to a control signal (or brake pressure control) from the vehicle control unit. A sensor 23 for detecting the CVT output revolution number comprises a vehicle speed sensor; a sensor 24 for detecting the degree of opening of the accelerator to control the engine comprises a throttle sensor; a sensor (unnumbered) for detecting the OFF condition of the accelerator pedal, i.e., the power OFF, comprises deceleration state detecting means; and a sensor 27 for detecting the charged battery capacity comprises battery residue detecting means. As a matter of fact, however, the battery residue detecting means does not detect the residual capacity directly but determines it by computing it in the control unit on the basis of the voltage, the current and the temperature.

The structure of the split drive unit 9 and the CVT 7 will now be described.

Figure 4:
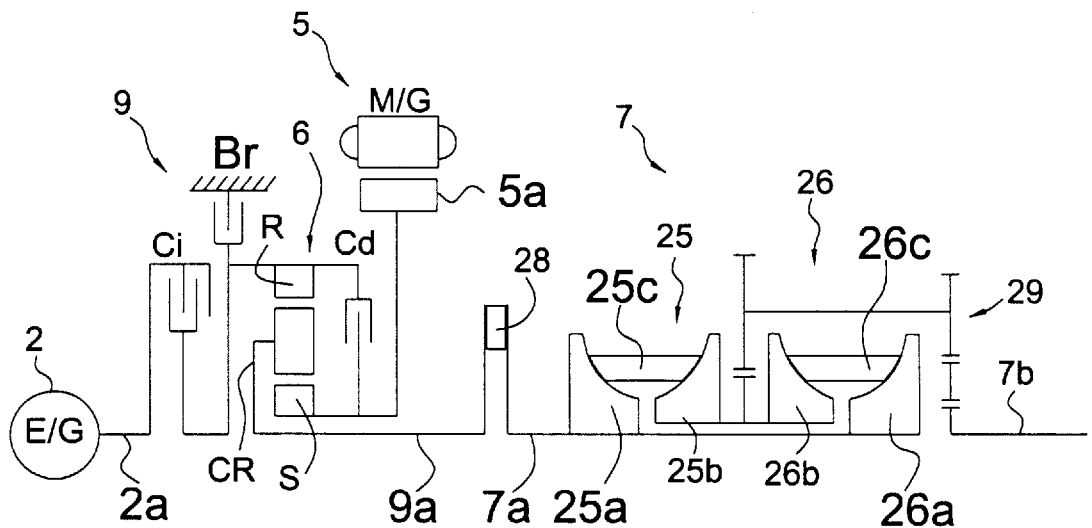
FIG. 4 is a skeleton structure showing a partially modified embodiment.

As shown in FIG. 4, the structure comprises two parallel CVT 7, i.e., toroidal CVT 25,26. The engagement means for operating the planetary gear 6 is composed of an input clutch Ci interposed between the engine 2 and the ring gear R, and a reverse brake Br for fixing the direct-coupled clutch Cd for connecting the ring gear R and the sun gear S. Between a split portion output shaft 9a and the CVT input shaft 7a, moreover, there is interposed a pressure cam 28 for retaining a pressure between the disc 25c,26c and the input/output rotary member 25a,26a/25b,26b. In the two toroidal CVT 25,26, moreover, their individual input rotary members 25a,26a are fixed on the input shaft 7a, their output rotary members 25b,26b are connected to each other and to the output shaft 7b through a gear train 29, and their discs 25c,26c are so connected that they can rotate at equal angles.

Figure 5:
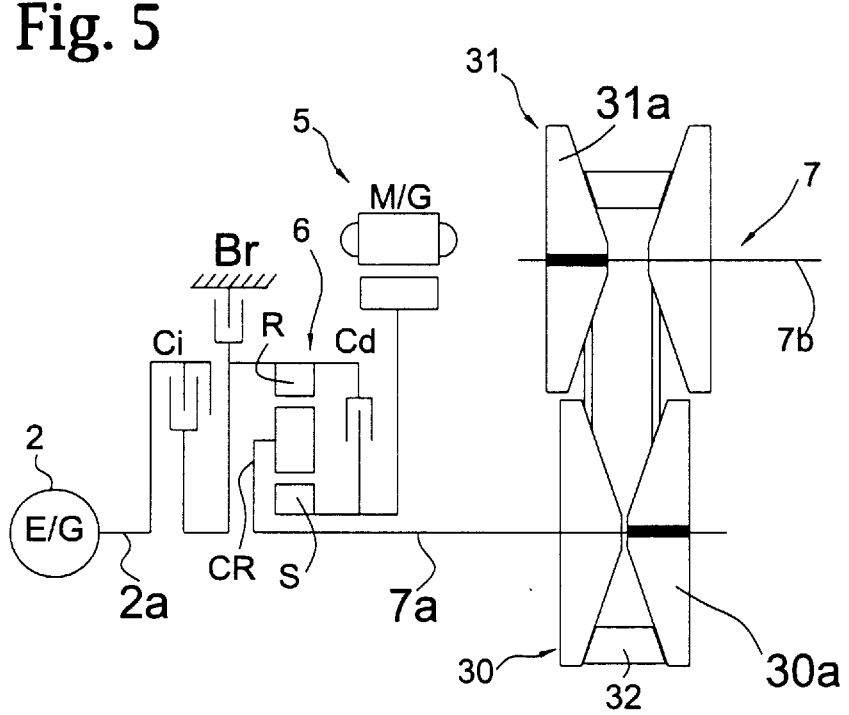
FIG. 5 is a skeleton structure showing a further partially modified embodiment.

FIG. 5 shows a type structure when the CVT 7 is a belt type CVT. The belt type CVT comprises a primary pulley 30, a secondary pulley 31 and a belt 32 made of a metal and running on the two pulleys 30,31. The effective diameter of the belt 32 is changed to change the speed of the CVT by moving the movable sheaves 30a,31a of the two pulleys 30,31 in the axial direction. The primary pulley 30 is connected to the input shaft 7a whereas the secondary pulley 31 is connected to the output shaft 7b. Incidentally, the split drive unit 9 is similar to that of the foregoing embodiment.

Moreover, the individual engagement means, as shown in FIGS. 4 and 5, are operated as shown in the operation diagram of FIG. 6. In the power split mode, the split drive unit 9 functions at the start and at a low/medium speed. The output of the engine 2 is transmitted to the ring gear R through the input clutch Ci. On the other hand, the rotor 5a of the motor-generator 5 is connected to the sun gear S to charge the engine output partially or to output it as the motor so that the composed force is output from the carrier CR to the CVT input shaft 7a.

On the other hand, the parallel hybrid mode functions in a medium/high speed range. In this state, the rotary elements of the planetary gear 6 are rotated together, and the output of the engine 2 is fed as it is to the CVT input shaft 7a. At the same time, the motor-generator 5 is connected to the input shaft 7a to assist the engine output or to charge the output partially.

The motor mode is in the state in which the accelerator opening is small and in which the revolution number is small, e.g., in which the engine 2 need not be used, such as in a traffic jam. Then, the motor-generator 5 is used as the motor to drive the vehicle. In this state, the input clutch Ci is released to disconnect the engine 2 and the CVT input shaft 7a, and the direct-coupled clutch Cd is applied to output the revolution of the motor-generator rotor 5a directly to the input shaft 7a.

On the other hand, the engine mode functions during high speed cruising, and the vehicle is driven exclusively by the engine output without any participation of the motor-generator 5. In this state, the input clutch Ci and the direct-coupled clutch Cd are applied to feed the engine output directly to the CVT input shaft 7a. At this time, the motor-generator 5 turns OFF the magnetic field circuit to allow the rotor 5a to rotate idly.

The regenerative brake mode has a variety of patterns, as will be described hereinafter. In one mode, the direct-coupled clutch Cd is connected and the planetary gear 6 is in the direct-coupled state. In this state, the vehicular inertia energy acting upon the CVT input shaft 7a is converted into electrical energy by the motor-generator 5, and the electrical energy is stored in the battery. Incidentally the regenerative brake mode can be effected even if the input clutch Ci is connected.

In the reverse mode for moving the vehicle backward, on the other hand, the input clutch Ci and the direct-coupled clutch Cd are released, and the reverse brake Br is applied. In this state, the motor-generator 5 functions as the motor so that its output is reversed from the sun gear S by the ring gear R in the stationary state, so that the reversed output is extracted to the carrier CR and output to the CVT input shaft 7a. At this time, the engine 2 is held in the idling state.

A partially modified split drive unit will be described with reference to FIG. 7. The split drive unit 9 is basically identical to that of the foregoing embodiment, as shown in FIGS. 4 and 5, but a bypass input clutch Cb is interposed between the engine output shaft 2a and the CVT input shaft 7a. In the present embodiment, the individual engagement means operate as shown in the operation diagram of FIG. 8. Specifically, the bypass input clutch Cb is released as in the foregoing embodiments, in the power split mode, in the motor mode, in the regenerative brake mode and in the reverse mode. In the parallel hybrid mode, the input clutch Ci and the direct-coupled clutch Cd are released, but the bypass input clutch Cb and the reverse brake Br are applied. In this state, the output of the engine output shaft 2a is transmitted through the bypass input clutch Cb directly to the CVT input shaft 7a, and the output of the motor-generator 5 is decelerated from the sun gear S by the ring gear R in the stationary state and is transmitted to the carrier CR until it is output to the input shaft 7a. For the acceleration/deceleration required by the vehicle, therefore, the (later-described) load leveling can be effected by the low torque (or in a low current) of the motor-generator 5. In the engine mode, on the other hand, the engine output is output from the bypass input clutch Cb directly to the input shaft 7a, and the planetary gear can then be set in a freely rotating state to stop the function of the motor-generator 5. Alternatively, all the clutches Cb, Ci and Cd may be applied as in the foregoing embodiments.

A further modified slip drive unit will now be described with reference to FIGS. 9 and 10.

Figure 9:
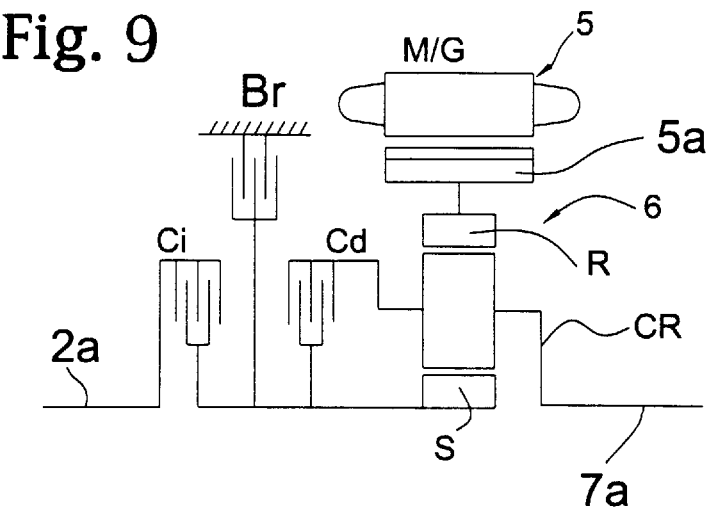
FIG. 9 is a skeleton structure showing a partially modified split drive unit.
Figure 10:
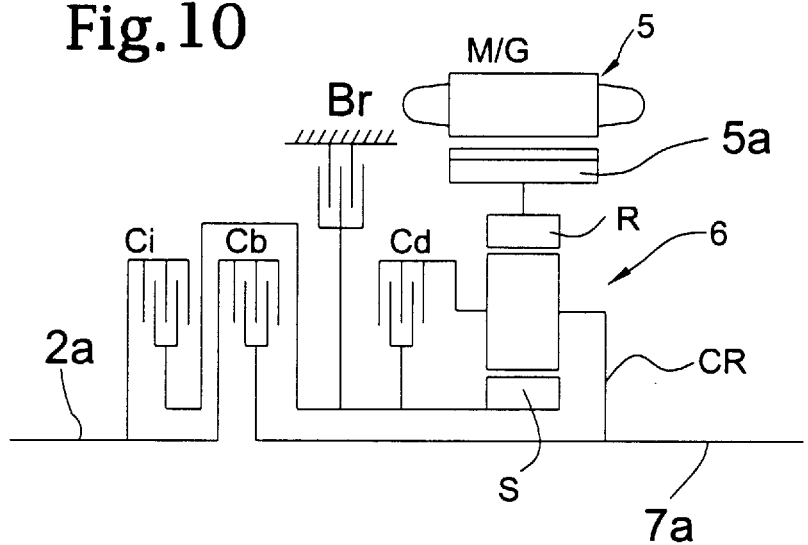
FIG. 10 is a skeleton structure showing a further partially modified split drive unit.

In FIG. 9, the engine output shaft 2a is connected to the sun gear S, and the motor-generator rotor 5a is connected to the ring gear R. In this embodiment, in the power split mode, a high gear ratio $iF=[(1+\lambda)/\lambda:\lambda=$Sun Gear Tooth Number/ Ring Gear Tooth Number] for the forward state can be taken to greatly decelerate the engine output revolution number (to about one third) and to transmit it to the CVT input shaft 7a to thereby generate a high forward drive power. In FIG. 10, the bypass input clutch Cb is added to the structure of FIG. 9. In the parallel hybrid mode, therefore the CVT input torque can be increased/decreased by $(1+\lambda)$ times with respect to the motor-generator torque.

Figure 11:
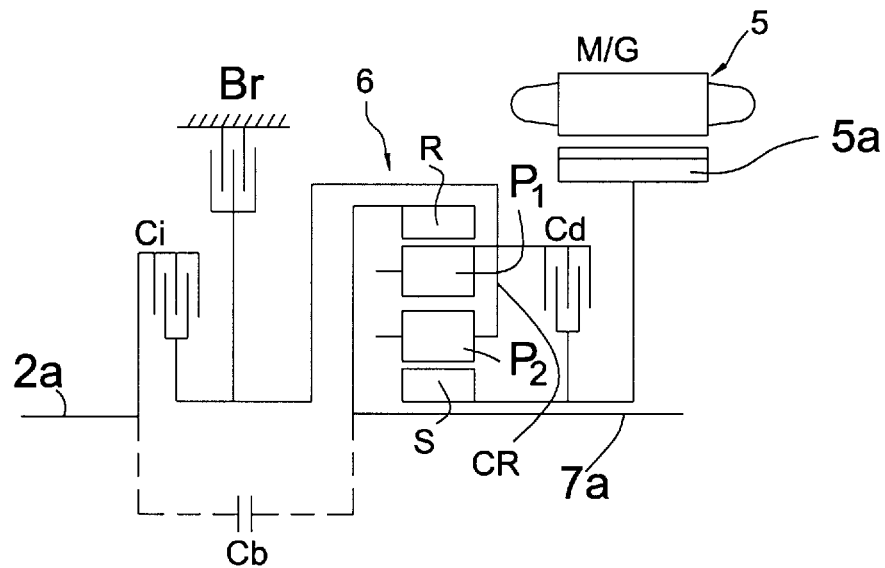
FIG. 11 is a skeleton structure showing a split drive unit using a double-pinion planetary gear.

The structure, as shown in FIG. 11, uses a double pinion planetary gear 6. The carrier CR, supporting pinions P1 and P2, is connected to the engine output shaft 2a; the sun gear S is connected to the motor-generator rotor 5a; and the ring gear R is connected to the CVT input shaft 7a. In this embodiment, the forward gear ratio $iF=[1/(1-\lambda)]$ and the reverse mode gear ratio ir $(=1/\lambda)$ take a value of two for the aforementioned gear ratio (i.e., Sun Gear Tooth Number/ Ring Gear Tooth Number) of 0.5. This means that the stall torque ratio can be substantially equalized to that of a vehicle mounting thereon an ordinary automatic transmission using a torque converter. Moreover, the engine output is input to the carrier CR so that the stress acting upon the gear tooth portions is lower than that of the later-described sun gear input to provide improved durability.

Figure 12:
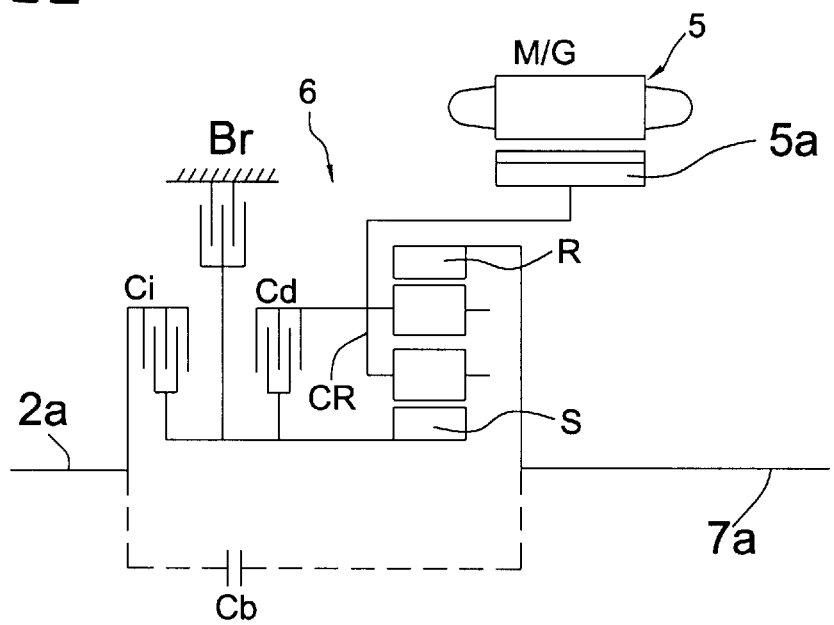
FIG. 12 is a skeleton structure showing the split drive unit, as partially modified.

The structure, shown in FIG. 12, likewise uses the double pinion planetary gear 6, the sun gear S which is connected to the engine output shaft 2a, the carrier CR which is connected to the motor-generator rotor 5a and the ring gear R which is connected to the CVT input shaft 7a. In the present embodiment, too, the torque ratio in the power split mode takes a value of about two, and is substantially equal to the stall torque ratio of the torque converter and to the torque ratio in the reverse mode.

Incidentally, the input clutch Ci, the direct-coupled clutch Cd, the bypass input clutch Cb and the reverse brake Br, as shown in FIGS. 9 to 12, may operate like the aforementioned ones, and the bypass clutch Cb may be incorporated, as indicated by dotted lines in FIGS. 11 and 12.

Figure 13:
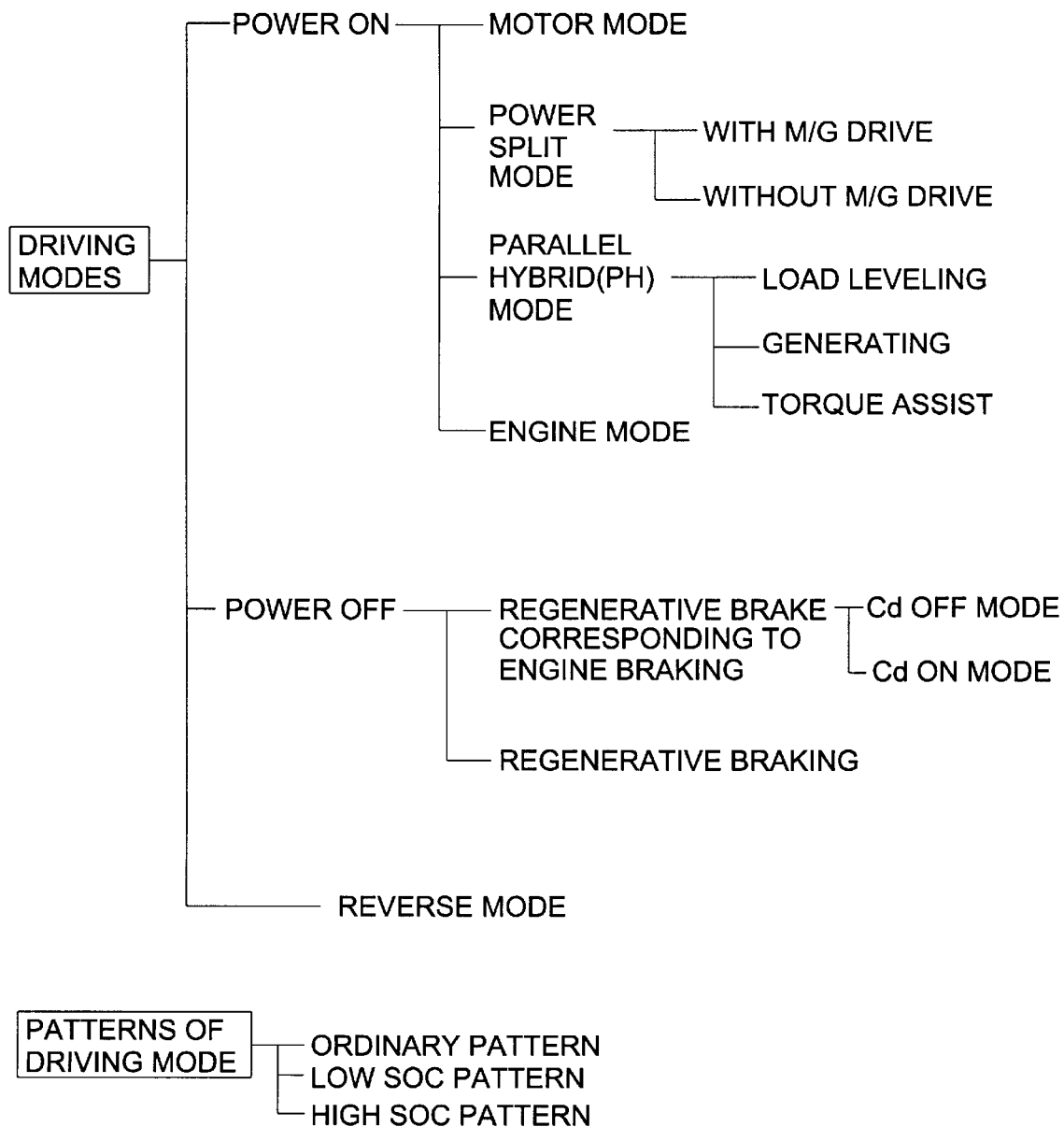
FIG. 13 is a diagram enumerating the travel modes according to the embodiment.

The controls of the drive unit will not be described, to include the split drive unit (or starter) and the CVT. FIG. 13 is a diagram showing the travel modes of the drive unit. They are forward within the travel drive state of power ON, in which the power is transmitted from the power source to the wheels so that the vehicle runs forward; and the state of power OFF, in which the power transmission is interrupted so that the vehicle runs by its inertia; and includes the reverse mode in which the power from the power source is reversed so that the vehicle runs backward. The power ON state is divided into the motor mode, in which the vehicle is driven exclusively by the motor-generator; the power split mode in which the split drive unit functions to drive the vehicle using both the engine and the motor; the parallel hybrid mode (or PH mode), in which the function of the split drive unit is interrupted to drive the vehicle using both the engine and the motor; and the engine mode in which the vehicle is driven exclusively by the engine.

The power split mode is further divided into the case (with the M/G drive) in which the motor-generator functions as a motor during discharge and the case (without the M/G drive) in which the motor-generator functions as a generator. The parallel hybrid mode is also further divided. The divided mode comprises a load leveling for charging the motor-generator (functioning as the generator) and for discharging (functioning as the motor), the generating run for charging only, and a torque assist for functioning as a motor only.

On the other hand, the power OFF mode is divided into the regenerative braking corresponding to the engine braking, in which the vehicular inertial force, i.e., the engine braking in the ordinary state is recovered as the regenerative braking, and the regenerative braking, in which the frictional force resulting from the foot braking is also recovered as the regenerative braking. Moreover, the regenerative braking corresponding to the engine braking is further divided into the case of the power split state, in which the direct-coupled clutch Cd is OFF, and the case of the parallel hybrid state, in which the direct-coupled clutch Cd is ON. On the other hand, the travel patterns are exemplified by the ordinary pattern, in which the charged state of the battery is proper; the low SOC pattern, in which the charged state of the battery is low; and the high SOC pattern, in which the charged state is high.

Figure 14:
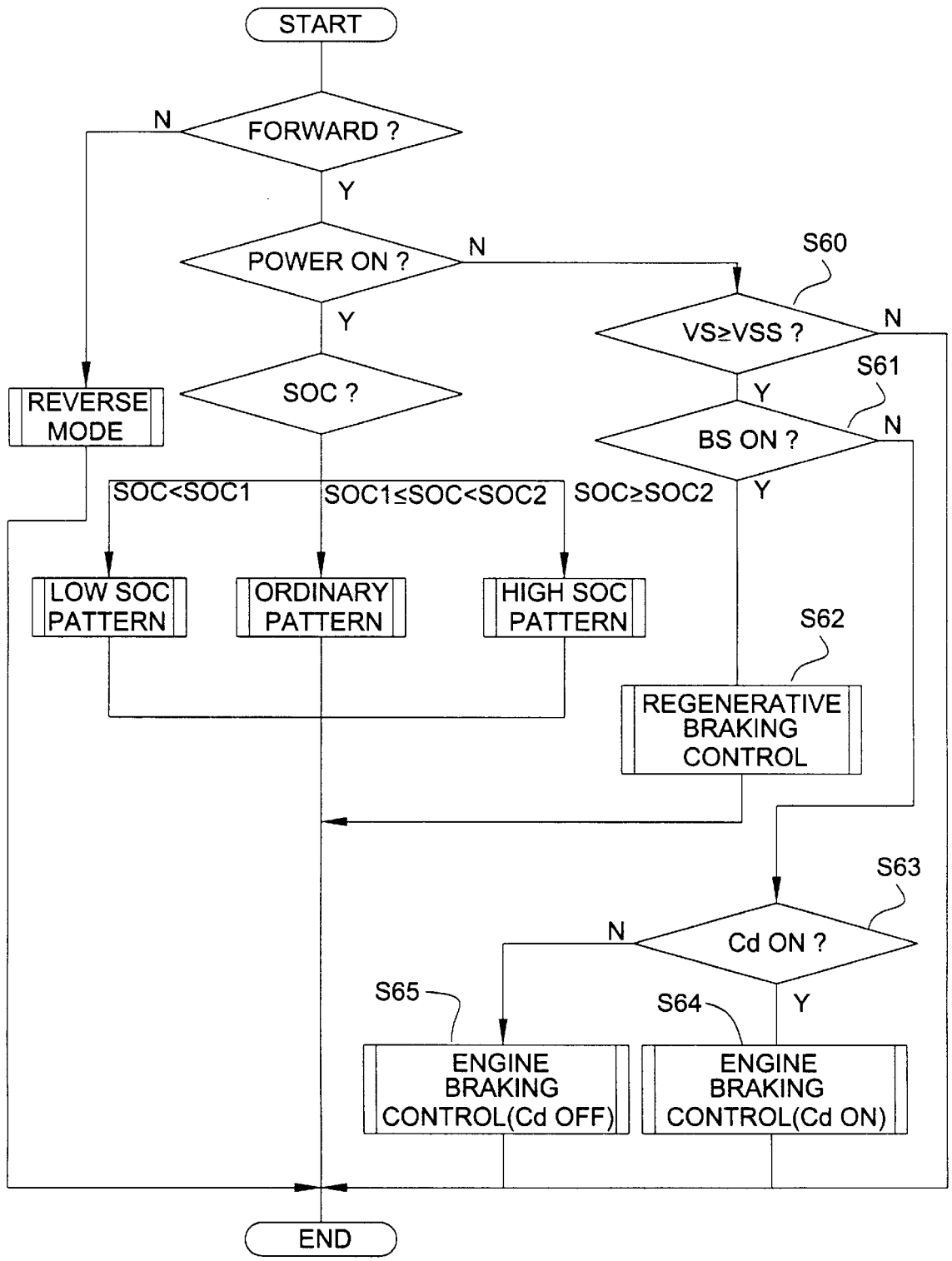
FIG. 14 is a flow chart showing the main routine of the travel modes.

FIG. 14 is a flow chart showing the main routine of the aforementioned individual travel modes and travel mode patterns. In FIG. 14, the letters SOC (State Of Charge) indicate the charged state of the battery, and letters SOC1, 60%, and SOC2, 85%, indicate predetermined charged capacities of the battery. Moreover, the letters VS designate a vehicle speed, the letters VSS a substantially stopping vehicle speed from the stop to a very low speed, the letters BS a brake switch for detecting the depression of the foot brake pedal, and the letters Cd the aforementioned direct-coupled clutch.

Figure 15:
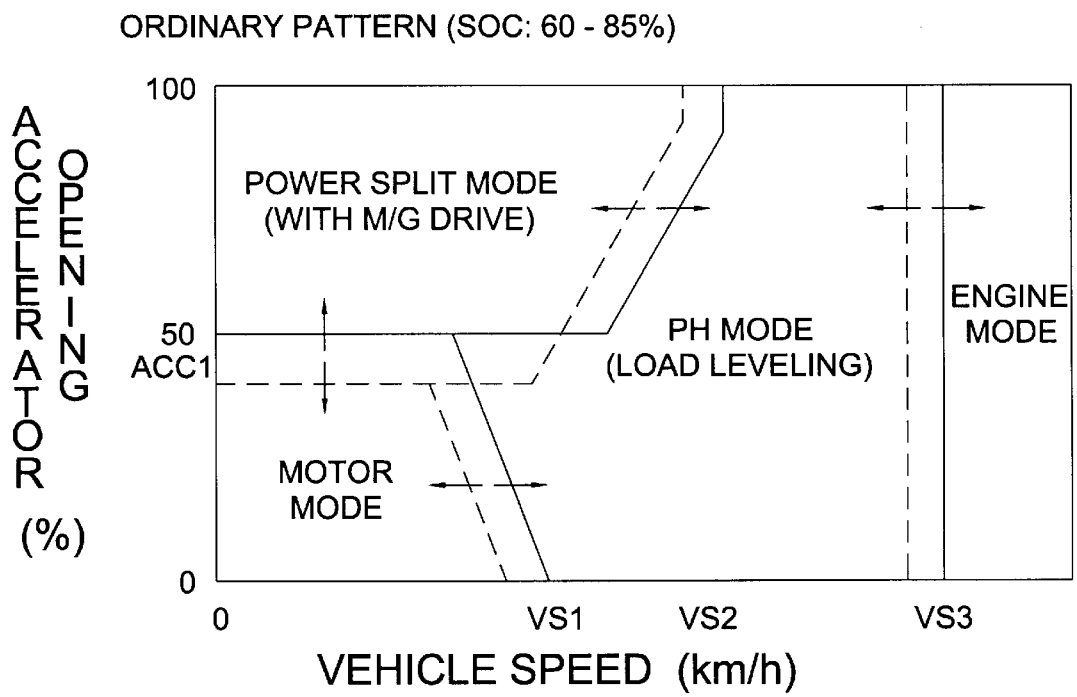
FIG. 15 is a diagram showing an ordinary pattern.
Figure 16:
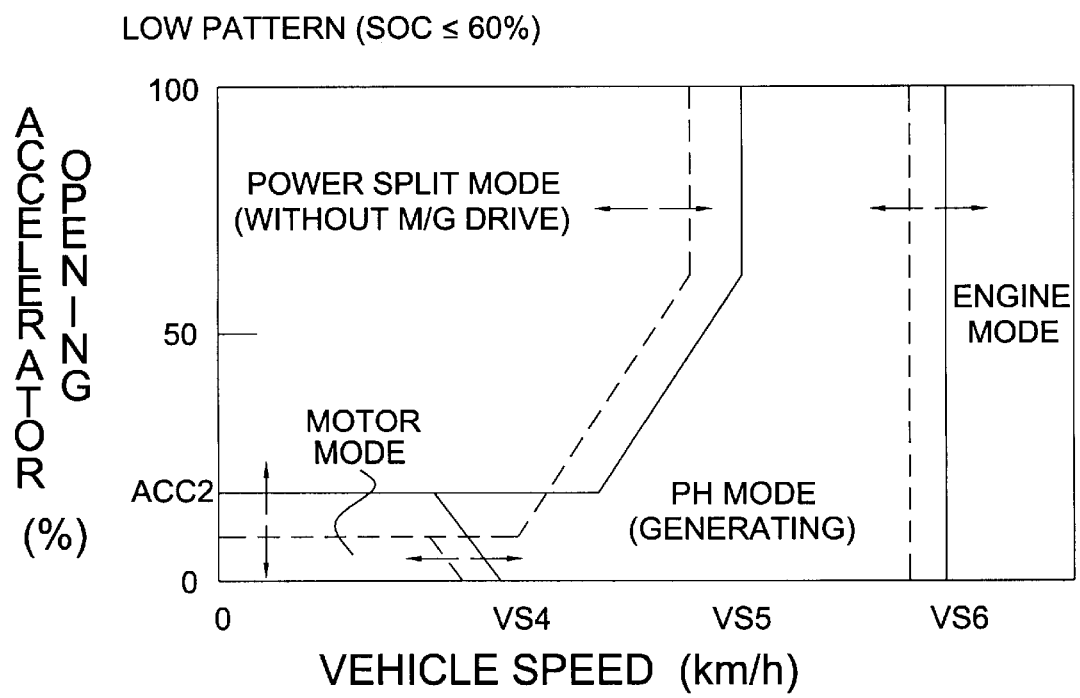
FIG. 16 is a diagram showing a low battery residue pattern.
Figure 17:
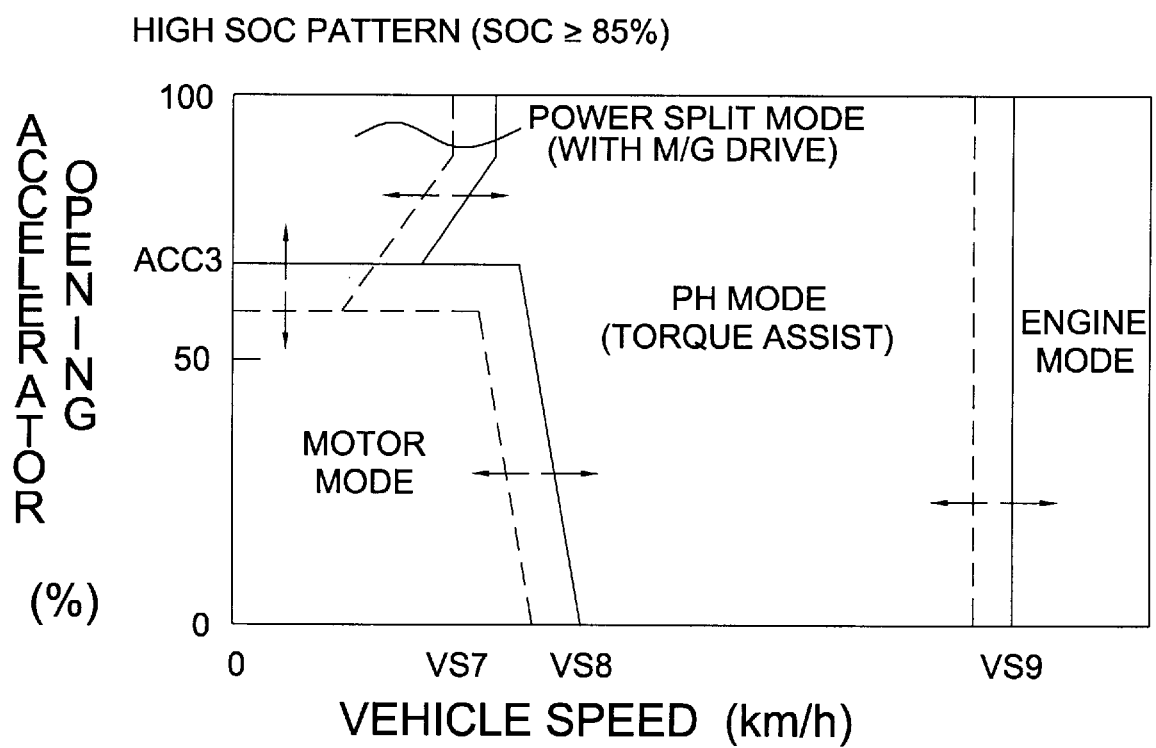
FIG. 17 is a diagram showing a high battery residue pattern.

Here, during the ordinary pattern, the battery charge is proper (i.e., the SOC allowance of 60 to 85% of capacity), as illustrated in FIG. 15. The solid curves and broken curves indicate the switching lines between modes when moving in the direction of the arrows (the same comment applies to FIGS. 16 and 17). In the low SOC pattern, the battery charge is low (60%), as illustrated in FIG. 16, so that the charging of the battery is given the highest priority. In the high SOC pattern, the battery charge is high (85%), as illustrated in FIG. 17, so that the motor-generator functions exclusively as the motor. Incidentally, the vehicle speed must satisfy the relationships of VS4<VS1<VS8 and VS7<VS2, and the accelerator opening ACC must satisfy the relationships of ACC2<ACC1<ACC3 (as shown in FIGS. 15–17). Moreover, the aforementioned charged state of the battery is decided in terms of the signal coming from the (not shown) battery residual sensor, the accelerator opening of each pattern is detected by the throttle sensor 24 (FIG. 3), and the vehicle speed is detected by the vehicle speed sensor 23 (FIG. 3).

Figure 18:
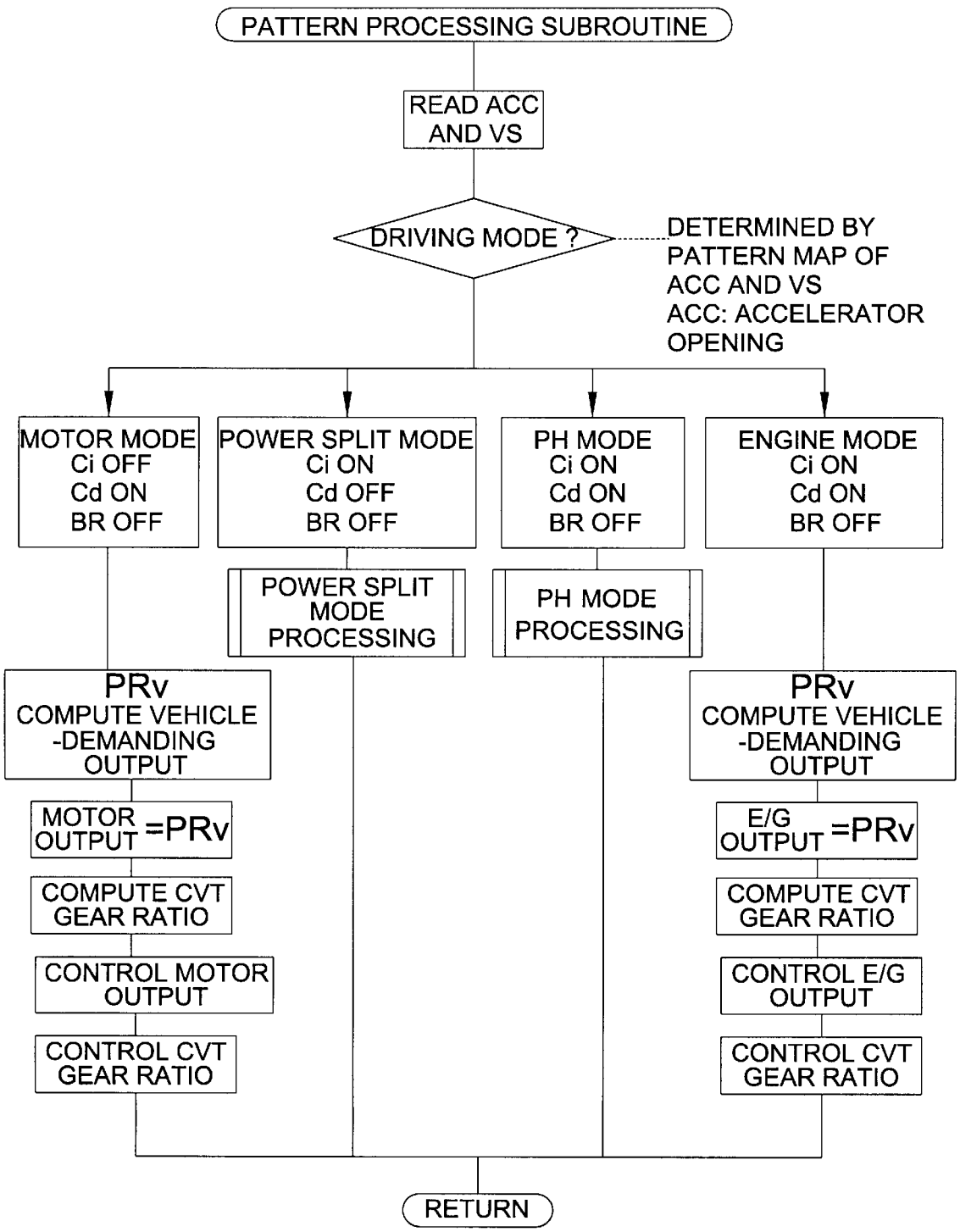
FIG. 18 is a flow chart showing a pattern processing subroutine.

FIG. 18 shows a processing routine according to the aforementioned travel modes. The motor mode, the power split mode, the parallel hybrid mode and the engine mode are selected according to the aforementioned patterns on the basis of the accelerator opening (ACC) and the vehicle speed (VS) and are set by the individual operations of the input clutch Ci, the direct-coupled clutch Cd and the reverse brake Br, as shown in FIG. 6. In the motor mode, the input clutch Ci is turned OFF and disconnected from the engine and the direct-coupled clutch Cd is turned ON, so that the rotation of the rotor of the motor-generator 5 is transmitted directly to the CVT input shaft 7a. Moreover, the output (PRv), as required by the vehicle, is computed so that the motor-generator 5 output is set to match the required output. At the same time, the gear (revolution) ratio of the CVT is computed so that the motor output control and the CVT gear ratio control are executed along the highest efficiency curve of the motor-generator 5.

In the power split mode and the parallel hybrid mode, on the other hand, the individual mode processings are executed, as will be described. In the engine mode, on the other hand, both the input clutch Ci and the direct-coupled clutch Cd are ON so that the engine output shaft 2a is directly coupled to the CVT input shaft 7a. In the engine mode, as in the foregoing motor mode, the output (PRv) required by the vehicle is computed so that the engine output is set to match the required output. At the same time, the gear ratio of the CVT is computed so that the engine output control and the CVT gear ratio control are executed along the highest efficiency curve of the engine 2.

Figure 19:
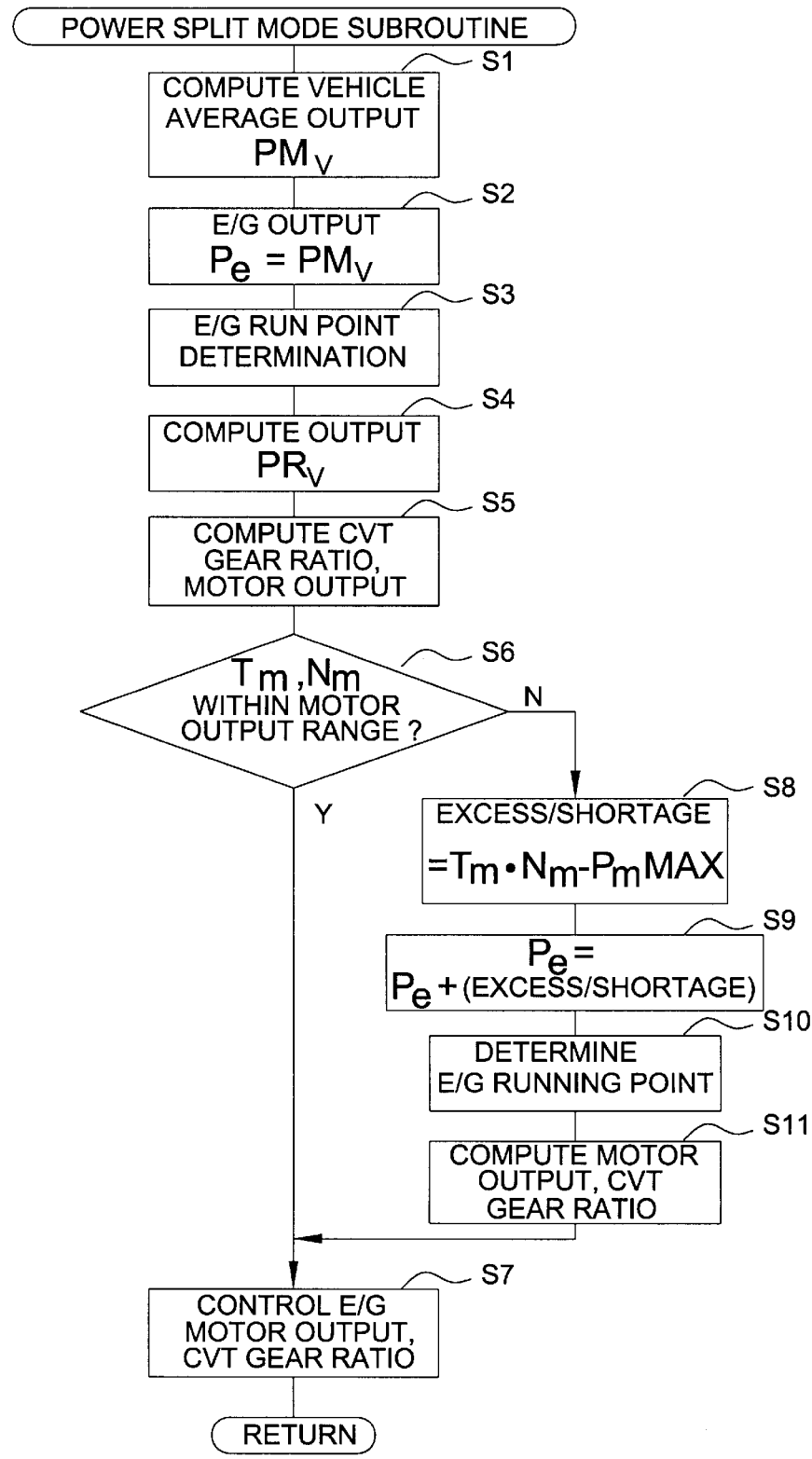
FIG. 19 is a flow chart showing a power split mode processing.

FIG. 19 is a flow chart showing the power split mode processing of FIG. 18. This power split mode functions at the start and at low to medium speed travel (e.g., 0 to 60 Km/h) of the vehicle. In this mode, as described above, the input clutch Ci is turned ON but the direct-coupled clutch Cd and the reverse brake Br are turned OFF, so that the planetary gear 6 functions. At Step S1, a vehicular average output (PMv) is computed, for example, by an interval averaging method, in which the instantaneous required outputs of the vehicle are averaged for the intervals of a predetermined sampling period (e.g., every 30 sec), or the moving averaging method, in which the data of the instantaneous required outputs in N-number from the past to the present are averaged for each sample. Subsequently, Step S2, the engine output (Pe) is set to match the average output (PMv) of the vehicle. As a result, the engine output is controlled along the best mileage curve by the gentle fluctuations based upon the aforementioned averaging, and the engine running point, i.e., the engine torque (Te) and the engine revolution number (Ne) is determined, at Step S3, from the aforementioned engine output. On the basis of the rise in the drive force from the accelerator opening and the vehicle speed, moreover, the present required output (PRv) of the vehicle and the required revolution number (NRv) of the vehicle are determined at Step S4. The aforementioned average output of the vehicle is set to the engine output (Pe=PMv) so that the output (or the discharge) and the power generation (or the charge) to be supplemented by the motor-generator are close to ±0 during travel.

From the difference between the engine output (Pe) and the required output (PRv), therefore, the output of the motor-generator 5 is computed at Step S5, as well as the gear (revolution) ratio of the CVT 7. Specifically, the following relationships hold for a torque T, a revolution number N, a suffix m indicating the motor-generator 5, a suffix e indicating the engine 2, a suffix c indicating the CVT input, a value Rv required by the vehicle, a CVT gear ratio Rcvt, and a tooth number ratio $\lambda(Z_S/Z_R)$ of the sun gear S and the ring gear R of the planetary gear:

Tm=λXTe;

Tm+Te=Tc;

TRv=RcvtXTc;

Nc=RcvtXNRv;

and $$Nm=[(1+\lambda)/\lambda]Nc-(1/\lambda)XNe.$$

In other words, with the engine held in the predetermined output state (for the constant Ne and Te) to match the vehicular average output value, as indicated at Step S1, the motor torque Tm is computed from the output torque Te of the engine on the basis of the tooth number ratio λ of the planetary gear; the input torque Tc (=output torque of the split drive unit) of the CVT is computed from the motor torque Tm and the engine torque Te; and the torque ratio Rcvt of the CVT 7 and the output revolution number Nm of the motor-generator 5 are computed at the required torque and the revolution number (or vehicle speed).

These discussions are summarized by expressing the CVT output torque (Tout) for Te=constant and Tm=constant and the CVT output revolution number (Nout) for Ne=constant and Nm=variable, as follows:

Tout=(Te±Tm)Rcvt;

and $$Nout=(Ne+\lambda Nm)/Rcvt(1+\lambda);$$

where Tm is added when the motor-generator 5 acts as a motor and Tm is subtracted when the motor-generator 5 acts as a generator.

Moreover, it is decided, at Step S6, whether the motor torque Tm and the motor revolution number Nm are within the output range of the motor-generator 5. If the answer is YES, the outputs of the engine 2 and the motor-generator 5 and the gear (or torque) ratio of the CVT are controlled, at Step S7, to the computed values from Steps S3 and S5. If the charged state of the battery has an allowance, that is, SOC≦60%, as shown in FIGS. 15 and 17, the motor-generator 5 covers both the discharge range to function as the motor and the charge range to function as the generator (+PmMAX to −PmMAX: with the M/G drive). If the charged state has no allowance, that is, SOC<60%, as shown in FIG. 16, the motor-generator 5 covers only the charge range (0 to −PmMAX: without the M/G drive) to function as the generator.

If the answer of Step S6 is NO: the excess/shortage (=TmNm−PmMAX) is computed at Step S8; the engine output Pe is set, at Step S9, to compensate the excess/shortage; the engine running point (Te and Ne) is determined at Step S10; and the motor output and the CVT gear ratio are computed at Step S11. In short:

Tm=TmMAX;

Nm=Ne;

and $$Rcvt=Ne/NRv.$$

The power split mode will now be described in detail. For accelerations at the start, or for low to medium speed travel, the engine output Pe is held at a predetermined value (Te=constant and Ne=constant) by the average output required by the vehicle. In this state, the input revolution number (=the output revolution of the split drive unit: the carrier revolution) of the CVT is adjusted by reducing the power generation of the motor-generator 5 and by assisting the engine output, or drive, source as the motor. At this time, the input torque of the CVT is always constant [Tc=Tm+Te=$\lambda$XTe+Te=Te($\lambda$+1); Tc=1.5 Te for $\lambda$=0.5]. Since the CVT gear ratio can be continuously adjusted within a predetermined range (e.g., 0.4 to 2.3), the gear ratio Rcvt of the CVT 7 is so adjusted that the input revolution Nc of the CVT 7 may be the revolution number NRv required by the vehicle. Since the output torque of the CVT 7 fluctuates during the adjustment of the gear ratio, the revolution number Nm of the motor is also adjusted. As a result, the output values (TRv and NRv), as required by the vehicle, can be satisfied, with the engine output being held in the predetermined state, by adjusting both the revolution number of the motor-generator 5 in the constant torque and the gear (or torque) ratio of the CVT 7.

When the start and the predetermined acceleration are achieved to produce steady travel state, the engine output torque (for the constant revolution number) is gradually increased to match the required output of the vehicle in the steady travel state, and the corresponding assist torque by the motor-generator 5 is gradually decreased. As a result, the engine output can be gently changed (in the quasi-steady state) while being held at a predetermined point of the best mileage curve for a predetermined time period thereby improving mileage and exhaust gas performance. In the case of deceleration from a predetermined travel state, on the other hand, the motor-generator 5 functions as a generator so that the engine output can be controlled as in the foregoing mode while charging the battery.

Figure 20:
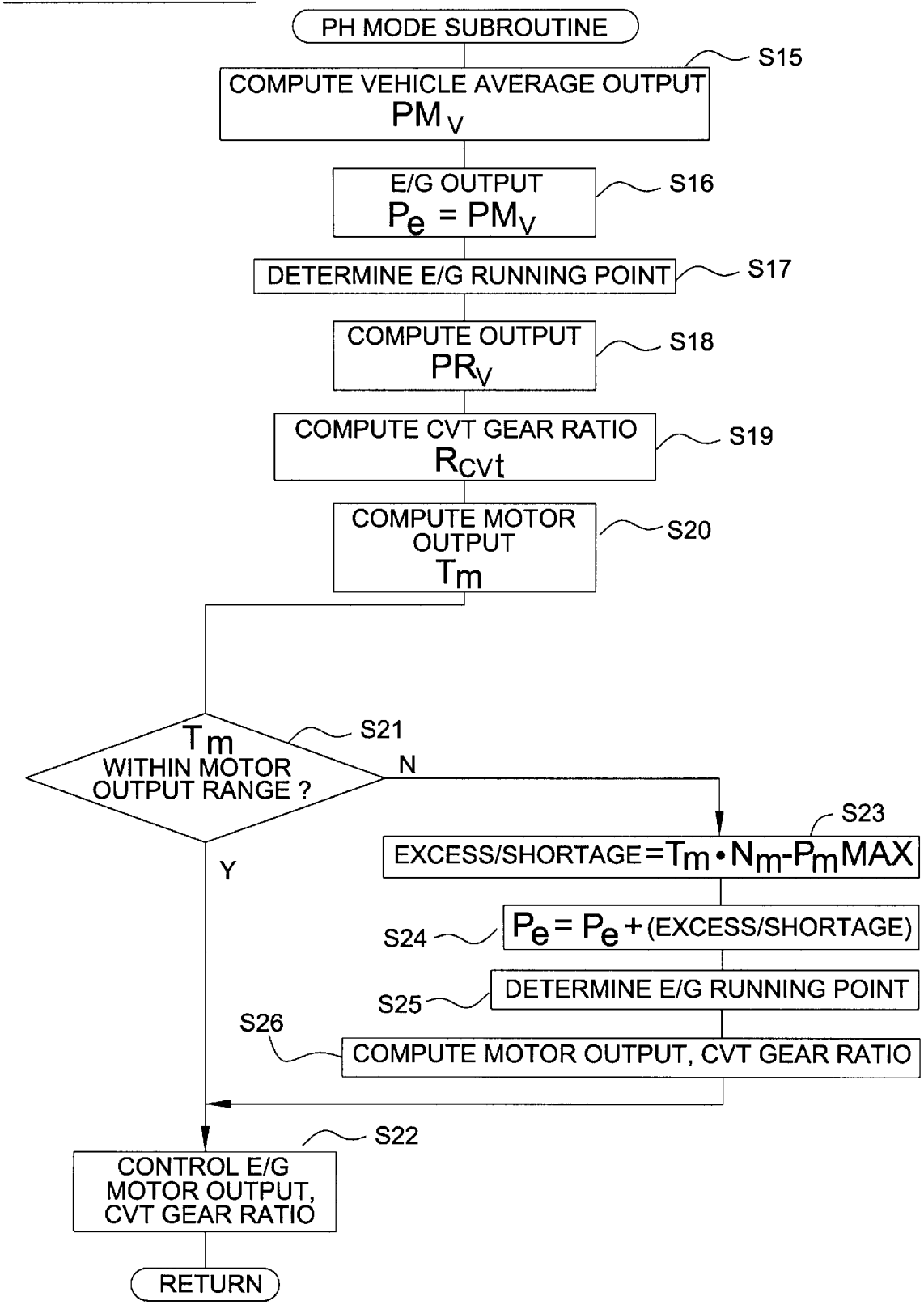
FIG. 20 is a flow chart showing load leveling of a parallel hybrid mode.
Figure 21:
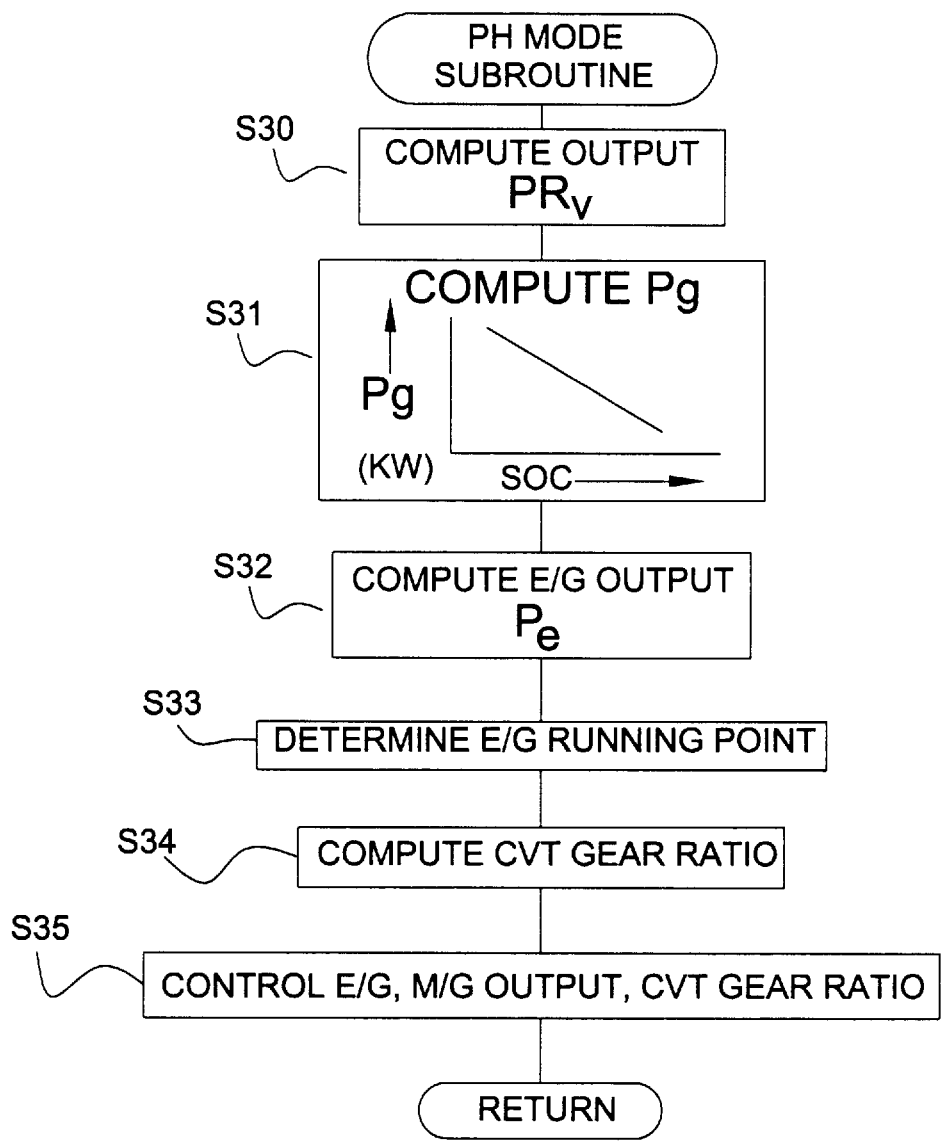
FIG. 21 is a flow chart showing generating travel processing in the parallel hybrid mode.
Figure 22:
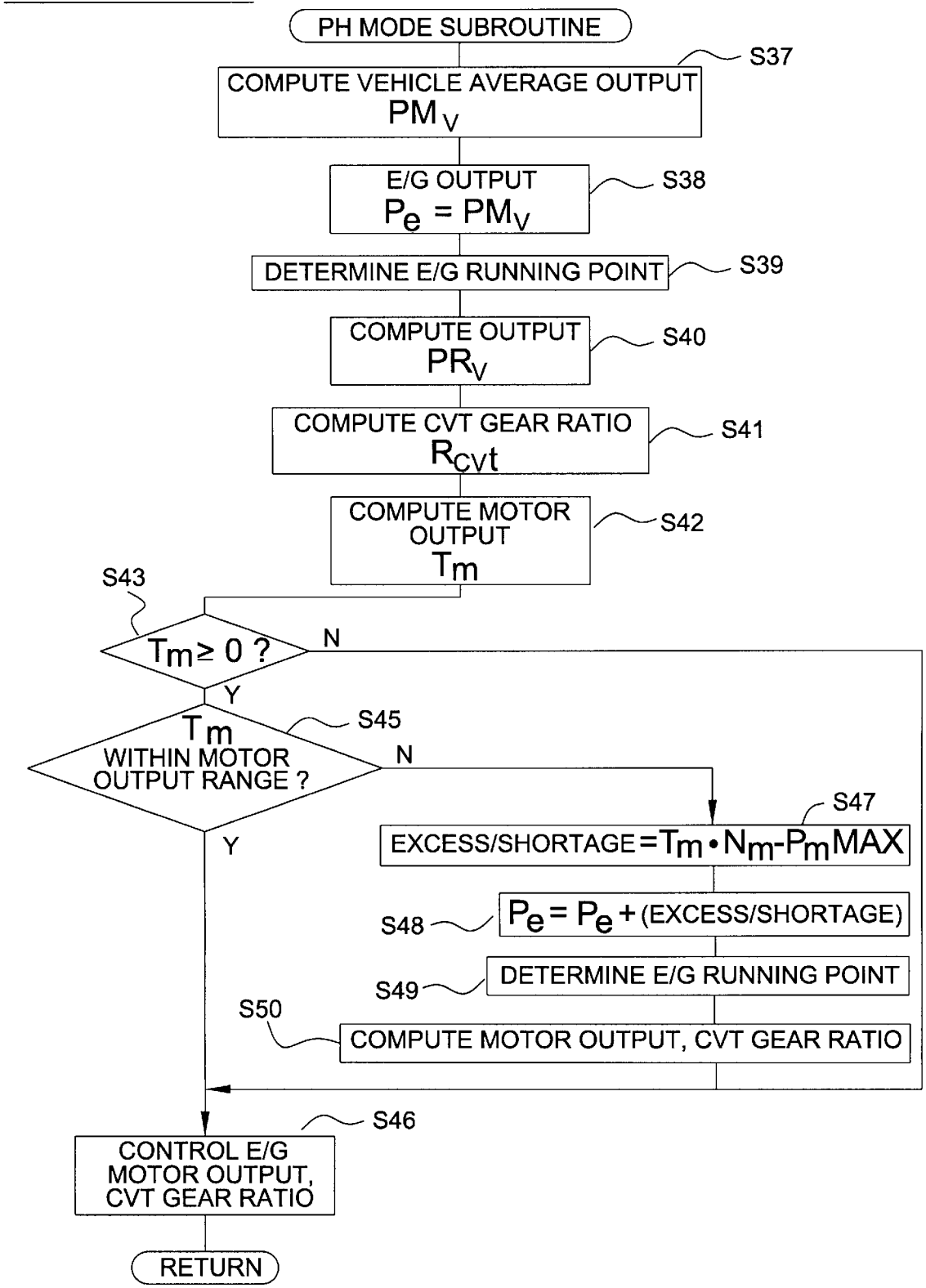
FIG. 22 is a flow chart showing torque assist processing in the parallel hybrid mode.

With reference to FIGS. 20 to 22, the subroutine for parallel hybrid mode processing (FIG. 18) will be described. The parallel hybrid mode functions in the medium to high speed travel state (e.g., 60 to 180 Km/h). In this mode, the engine output shaft 2a and the CVT input shaft 7a are directly coupled, and the torque of the motor-generator 5 is adjusted. First, with reference to FIG. 20, the load leveling mode subroutine, that is, the control the case in which the battery charge of FIG. 15 is proper, will be described. As in the foregoing power split mode, the vehicular average output PMv is first computed at Step S15. Then, the engine output Pe is set to the vehicular average output, at Step S16, and the engine running point (Te and Ne) is determined at Step S17. At this time, the engine running point (Te and Ne) is gently controlled on the basis of the vehicular average output and along the best mileage curve (i.e., to the quasi-steady state). On the other hand, the output PRv (TRv and NRv) required by the vehicle is computed, at Step S18, by the drive force UP from the accelerator opening and the vehicle speed. As a result, the CVT gear ratio (Rcvt) is computed, at Step S19, on the basis of Rcvt=Ne/NRv.

Moreover, the motor-generator 5 output torque is computed at Step S20. Specifically, the motor torque (Tm) is computed from Tm=TRv−Te, and the revolution number Nm is equal to the engine revolution number Ne, so that the output (Pm) is expressed by Pm=TmNe. Specifically, with the engine output being held in the predetermined state depending upon the vehicular average output, the revolution (or gear) ratio of the CVT 7 is controlled to shift the engine revolution number to the revolution number required by the vehicle, and the motor-generator 5 adjusts the torque at the constant speed, as specified by the engine revolution number, to absorb the torque change due to the revolution ratio of the CVT thereby to control the torque to that required by the vehicle.

These discussions are summarized by expressing the CVT output torque (Tout) by Tout=(Te±Tm)Rcvt for Te=constant and Tm=variable, and the CVT output revolution number (Nout) by Nout=Ne/Rcvt for Ne (=Nm)=constant.

It is then determined, at Step S21, whether the motor torque Tm is within the motor output range. If the answer is YES, the engine 2 and motor-generator 5 outputs and the CVT gear ratio are controlled (at Step S22) on the basis of the computed values of Steps S19 and S20. At this time, in the load leveling, the motor-generator torque covers both the output direction, i.e., the discharge region in which the motor-generator 5 functions as a motor to assist the engine 2, and the input direction, i.e., the charge region in which the motor-generator 5 functions as a generator to charge the battery.

If outside the motor-generator output range, on the other hand, the excess/shortage (=TmXNe−PmMAX) is computed (at Step S23); the engine output Pe is newly set (at Step S24) to supplement the excess/shortage; the engine running point (Te and Ne) is determined (at Step S25); and the motor-generator output and the CVT gear ratio are computed (at Step S26). In short, Tm=TmMAX; Nm=Ne; and Rcvt=Ne/NRv.

More specifically, when the vehicle speed is accelerated from $V_1$ to $V_2$, for example, the CVT 7 is shifted up from $V_1$ to $V_2$ while leaving the engine at a constant torque and at a constant revolution. Since the torque then drops, the motor-generator 5 simultaneously outputs a torque to supplement the drop. When the vehicle speed rises to $V_2$ to produce the steady state, the assist of the motor-generator output is gradually decreased whereas the engine output is gradually increased. Moreover, the output control of the engine 2 is assisted by the motor-generator 5, as described above, so that the engine output can be gently moved along the CVT maximum efficiency curve. At the same time, the engine output is selected corresponding to the optimum point in accordance with the vehicle speed and the throttle opening, and the set engine torque and revolution number are held constant for a predetermined time period and are then smoothly and gradually changed (in the quasi-steady state). This improves not only the mileage but also the exhaust gas performance. Incidentally, when the vehicle is to be decelerated, the battery 3 is charged with the excess engine output by the motor-generator 5 whereas the engine 2 is held in the aforementioned quasi-steady state.

Referring now to FIG. 21, the generating travel mode in the parallel hybrid mode will be described, that is, the mode in which the travel is effected while generating electric power when the battery capacity is not sufficient, as shown in FIG. 16. First, as in the foregoing routine, the output PRv required by the vehicle is computed, at Step S30, using an averaging method or the like, and the generated power Pg is computed, at Step S31, from the graph of the state of charge SOC and the generated power Pg. From the sum of the required output PRv and the power Pg generated by the motor-generator 5, moreover, the engine output Pe (=PRv+Pg) is computed, at Step S32, and the engine running point (Te and Ne) is determined, at Step S33, on the basis of the computed engine output. Like before, moreover, the CVT gear ratio is computed, at Step S34, so that the engine output, the motor-generator output and the CVT gear ratio are controlled (at Step S35) on the basis of the computed gear ratio.

FIG. 22 is a subroutine showing the torque assist mode for the parallel hybrid mode, that is, the mode in which the motor-generator 5 functions only as a motor, i.e., outputs power, so that the travel is continued by assisting the engine 2 when the state of charge of the battery 3 is sufficient, as shown in FIG. 17. In the subroutine, Steps S37 to S42 are similar to Steps S15 to S20 of the load leveling, as shown in FIG. 20, and their description is therefore omitted. If it is determined at Step S43 that the motor torque Tm, computed at Step S42, is less than 0, namely, that the motor-generator 5 acts as the motor to assist the engine output, the outputs of the engine 2 and the motor-generator 5 and the CVT gear ratio are controlled, at Step S46, on the basis of the computed values Pe, Tm and Tcvt. If Tm≦0, on the other hand, it is determined, at Step S45, whether the motor torque Tm is within the motor output range. As at Step S43, the motor output range is located at only the side, i.e., discharge side, at which a mechanical energy output occurs, so that it is within the predetermined torque and revolution number. If within the motor-generator output range, the outputs of the engine 2 and the motor-generator 5 and the CVT gear ratio are likewise controlled, at Step S46, on the basis of the predetermined values. If the computed motor-generator output Tm is negative, the motor-generator 5 acts as a generator and charges the battery 3 or Tm is excessive so that Tm>TmMAX, the excess/shortage (=TmXNe−PmMAX) is computed at Step S47. A new engine output Pe is computed, at Step S48, by adding the excess/shortage to the engine output Pe based upon the aforementioned vehicular average output, as required. From these, the engine running point is determined, at Step S49, and the motor output and the CVT gear ratio are computed, at Step S50, by (Tm=0 or Tm=TmMAX and Nm=Ne) and (Rcvt=Ne/NRv).

Figure 23:
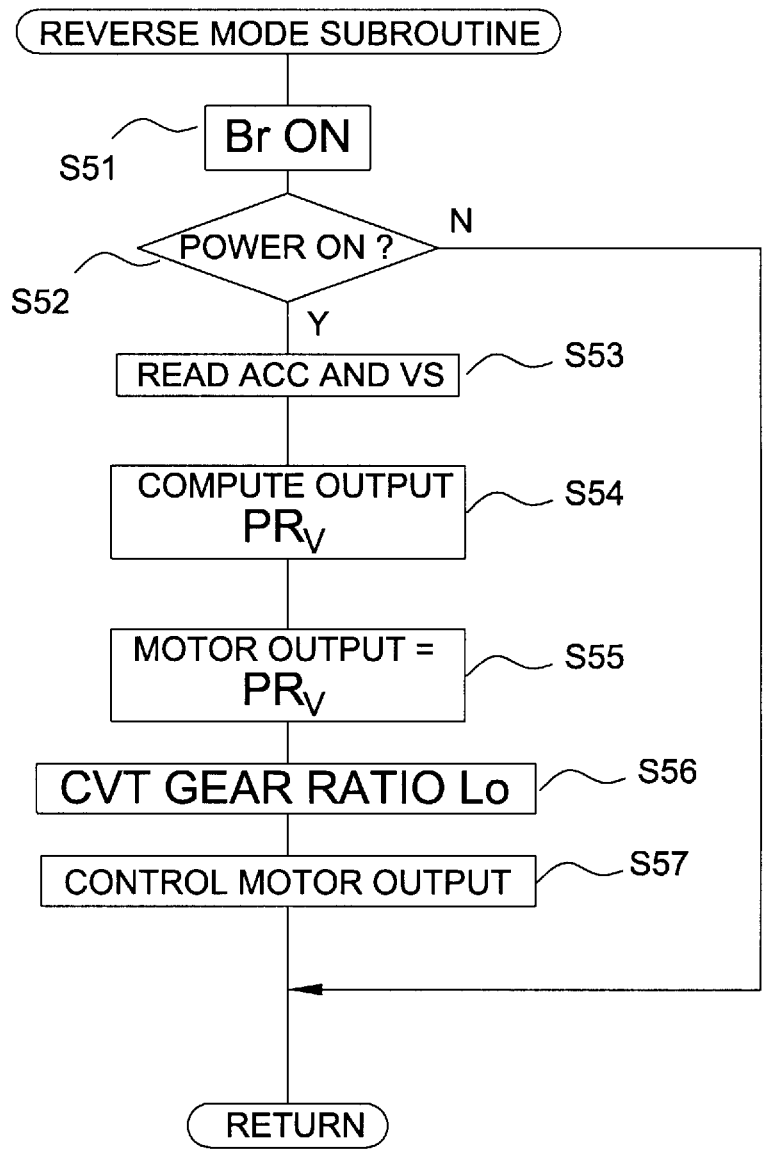
FIG. 23 is a flow chart showing reverse mode processing.

FIG. 23 is a subroutine showing the reverse mode of FIG. 14. With the input clutch Ci and the direct-coupled clutch Cd OFF, the reverse brake Br is applied at Step S51. As a result, the CVT input shaft 7a is disconnected from the engine output shaft 2a, so that the revolution of the rotor 5a of the motor-generator 5 is transmitted, as it is decelerated and reversed, from the sun gear S to the carrier CR by the ring gear R, as fixed by the applied reverse brake Br, until it is output to the CVT input shaft 7a. If the vehicle is driven, at Step S52, moreover, the accelerator opening ACC and the vehicle speed VS are read at Step S53, and the output (PRv), as required by the vehicle, is computed at Step S54 from the read values. Then, the motor-generator output (Pm=PRv) is set, at Step S55, to match the required vehicular output, and the CVT is set, at Step S56, to the predetermined low speed state, at a gear ratio Lo. In this state, the motor is controlled in Step S57 to the aforementioned motor-generator output.

The regenerative braking control of the main flow of FIG. 14 will now be described. When the vehicle is running in the forward coasting state, and at a vehicle speed over a predetermined low speed, VS≦VSS at Step S60, the brake pedal is depressed to turn ON the brake switch BS at Step S61. Then, the regenerative braking control is effected at Step S62. The regenerative braking control causes a judgment to the stroke necessary for the braking operation by detecting the displacement of the brake pedal and a control of the recovery in accordance with the state of charge SOC of the battery. Specifically, the total braking force of the vehicle is the sum of the regenerative braking force by the engine 2 and the hydraulic braking force. At this time, the gear ratio of the CVT is set by considering the maximum regeneration efficiency, the prevention of the busy shift and the response at the re-acceleration time. On the other hand, the input clutch Ci may be turned OFF, but the direct-coupled clutch Cd may be turned ON to bring the engine into the idling state so that the regenerative braking may be effected by the motor-generator 5. Alternatively, the input clutch Ci may be turned ON, and the direct-coupled clutch Cd may be turned ON to effect the regenerative braking by the motor-generator 5 and the engine 2 braking together.

If it is determined at Step S61 that the brake switch BS is OFF, the appropriate engine braking controls are effected at Steps S64 and S65. At this time, the engine braking control is effected in the split drive and in the direct-coupled state in dependence upon the ON/OFF state, Step S63, of the direct-coupled clutch Cd. In the direct-coupled engine braking control (Step S64), the input clutch Ci may be turned OFF whereas the direct-coupled clutch Cd may be turned ON to bring the engine into the idling state so that the foregoing engine braking may wholly lead to the regeneration by the motor-generator 5. Alternatively, the input clutch Ci may be turned ON whereas the direct-coupled clutch Cd may be turned ON so that the regeneration may be caused by the motor-generator 5 while effecting the engine 2 braking. In the split engine braking control (Step S65), both the input clutch Ci and the direct-coupled clutch Cd are OFF, and the vehicular inertia force, coming from the CVT input shaft 7a, is branched into the sun gear S and the ring gear R in a reaction against the carrier CR and, according to their gear ratio, so that the regeneration is caused by the motor-generator 5 while effecting the engine 2 braking. Incidentally, the ring gear R may be fixed by the reverse brake Br so that the regeneration may be effected by the motor-generator 5 from the sun gear S.

The modes of the embodiments have been described as the power split mode, the motor mode, the parallel hybrid mode (including the load leveling, the generating travel and the torque assist mode), and the engine mode. In spite of this description, however, the invention should not be limited thereto, but any mode, such as the parallel hybrid mode may be omitted, and only the power split mode may be sufficient. In addition, the power split mode may naturally be combined with another mode (or modes).

According to the invention, with the combustion engine being held in a predetermined state, the output, as required by the vehicle, can be satisfied by controlling the motor-generator and by controlling the continuously variable transmission continuously. As a result, at the time of changing the required output, the fluctuation in the vehicle output can be completely absorbed by the speed change control of the continuously variable transmission, to improve the mileage and to clean the exhaust gases.

Also, according to the invention, the connected/fixed relationships among the individual rotary elements of the planetary gear can be changed by controlling the engagement means in accordance with the vehicle speed and the throttle opening to thereby select the various modes.

Further, according to the invention, especially at the start and at the low and medium vehicle speed travels, the torque and the revolution number to satisfy the output required by the vehicle, can be output by changing the revolution number of the motor-generator at a constant torque to control the output of the motor-generator and by controlling the torque ratio of the continuously variable transmission. As a result, even at the start and at the low and medium vehicle speed travel, as having a high change in the drive force, the required output can be satisfied either in the predetermined state (or the steady state), in which the engine output is held in the predetermined state, or by changing the engine output smoothly and slowly, so that the fuel injection into the combustion chamber can be eliminated unlike at the acceleration/deceleration of the vehicle in the prior art, to improve the mileage performance and the exhaust gas performance.

Further, it is possible to establish the motor mode in which the vehicle is driven exclusively by the motor-generator. When the output required by the vehicle is low at a low vehicle speed and at a low throttle, the combustion engine need not be positively run where it has a low working efficiency so that the mileage and the exhaust gas performance can be further improved.

Also, the vehicle can function as a parallel hybrid one by transmitting the output of the combustion engine to the input member of the continuously variable transmission and by adding or subtracting the torque of the motor-generator to or from the input member. As a result, the torque of the motor-generator is controlled at a constant speed, and the continuously variable transmission is controlled to the revolution number required by the vehicle, so that the combustion engine can be held in the predetermined state. Especially at medium and high vehicle speeds, the parallel hybrid mode control can function to hold the combustion engine in the steady state or in a quasi-steady state to improve the mileage and the exhaust gas performance.

As discussed, in the parallel hybrid mode control, the torque from the motor-generator can be increased and transmitted to the continuously variable transmission by coupling the output shaft of the combustion engine and the third rotary element directly.

Further, in the power split mode and the parallel hybrid mode, control can be effected by holding the combustion engine at the predetermined position of the best mileage curve for a short time and then changing it smoothly and slowly. As a result, it is possible to ensure improvements in the mileage and the exhaust gas performance.

In addition, the combustion engine is controlled to trace the average output of the vehicle. As a result, although the combustion engine can be controlled slowly and smoothly, its output does not go far from the output required by the vehicle, but the charge and discharge of the motor-generator can be averaged to maintain a proper charge residue in the battery.

According to the invention, the motor-generator is used, for the load leveling, in both the charging and discharging directions. As a result, the motor-generator acts to compensate for the differences between the required output and the combustion engine output so that the combustion engine can be held in the steady state or quasi-steady state to improve mileage.

If the battery residue is low, the combustion engine generates electric power in the motor-generator while satisfying the required output for travel so that the troubles due to a shortage of charge in the battery can be prevented.

If the battery residue is high, the motor-generator functions as a motor to assist the engine output. As a result, the battery is prevented from being excessively charged, thereby ensuring a longer lifetime and extending the mileage.

According to the invention, the engagement means can be suitably switched according to the vehicle speed and the throttle opening, to select each of the motor mode, the power split mode, the parallel hybrid mode and the engine mode. As a result, the optimum mode can be selected according to the travel state of the vehicle to further improve the mileage and the exhaust gas performance. At a low vehicle speed and at a low throttle opening, for example, the mileage and the exhaust gas performance are improved in the motor mode because of the low working efficiency of the combustion engine. At a low vehicle speed and with a high throttle opening, the vehicular output requirement at the start, or at low and medium vehicle speeds, is satisfied by the power split mode. At medium and high vehicle speeds, on the other hand, the acceleration/deceleration, as effected by operating the accelerator, is changed/absorbed in the motor-generator by setting the parallel hybrid mode thereby to suppress the fuel consumption accompanying the acceleration/deceleration. If the vehicle speed is high, moreover, the working efficiency of the combustion engine is so high that the drop in the efficiency due to the participation of the motor-generator can be eliminated by setting the engine mode.

The selected regions of the individual modes are changed according to the residue of the battery so that the state of charge of the battery can always be held at the proper level. When the charge level is high, for example, the mileage can be improved by setting a high motor mode. When the charge level is low, on the other hand, the shortage of charge in the battery is prevented by setting a low motor mode.

The revolution of the motor-generator can be reversed and output in the planetary gear by the reverse engagement means so that the structure is compact as there is no requirement for any special forward/backward switching mechanism.

According to the invention, when the vehicle is decelerated, the inertial energy of the vehicle is regenerated by the motor-generator and stored in the battery. As a result, the mileage can be improved while using a battery with a relatively small capacity, by recovering the energy which might otherwise dissipate through the engine braking or the frictional braking.

According to the invention, the structure is also made compact by adopting a toroidal type continuously variable transmission having a relatively small size and the reliability can be improved by adopting the belt type continuously variable transmission.

Using the invention, the gear ratio of the planetary gear in the power split mode can be set to a proper deceleration state (e.g., 1.5) thereby to widen the range of use of the power split mode; the gear ratio of the planetary gear in the power split mode can be set to a high deceleration state (e.g., 3) thereby to achieve a high drive power; and the gear ratio of the planetary gear in the power split mode can be equalized to the stall torque ratio (e.g., 2) of the conventional torque converter.

Although the invention has been described with specificity, those skilled in the art would note modifications that would fall within the scope of the invention.

What is claimed is:

1. A vehicular drive unit, comprising:

a combustion engine;

a motor-generator for one of converting electric energy coming from a battery into mechanical energy to output the converted mechanical energy and for converting mechanical energy into electrical energy to store the converted electrical energy in the battery;

a planetary gear including at least three rotary elements;

a continuously variable transmission for changing the revolution of an input member continuously variably to output the changed revolution to drive wheels, wherein said planetary gear has a first rotary element connected to the output shaft of said combustion engine, a second rotary element acting in reaction against said first rotary element and said second rotary element connected to said motor-generator, and third rotary element connected to the input member of said continuously variable transmission; and split mode control means for controlling the output of said motor-generator by one of adding and subtracting it to and from the output of said combustion engine, said combustion engine held in a predetermined state, so that said third rotary element may have a constant torque but may change its revolution number to satisfy the output required by the vehicle, and for controlling the torque ratio of said continuously variable transmission so that the revolution number of said third rotary element may satisfy the revolution number required by the vehicle.

2. The vehicular drive unit according to claim 1, further comprising:

a vehicle speed sensor for detecting the vehicle speed;

a throttle sensor for detecting the throttle opening of said combustion engine; and engagement means for changing the connected/fixed relations among the first, second and third rotary elements of said planetary gear in response to the output signals coming from said vehicle speed sensor and said throttle sensor.

3. The vehicular drive unit according to claim 2, further comprising motor mode control means for controlling said motor-generator, wherein when the vehicle speed is low and the throttle opening is small, said engagement means are so controlled that the output shaft of said combustion engine may be disconnected from said first rotary element, and said motor-generator is controlled by said motor mode control means.

4. The vehicular drive unit according to claim 2, further comprising parallel hybrid mode control means for controlling the torque of said motor-generator by one of adding and subtracting the torque to and from the output of said combustion engine, said combustion engine held in a predetermined state, so that the output required by the vehicle may be satisfied by changing the torque for a constant speed of said third rotary element, and for controlling the revolution ratio of said continuously variable transmission so that the revolution number of said third rotary element may take a predetermined value, wherein in medium and high speed ranges of the vehicle speed, said engagement means is so controlled that said rotary elements of said planetary gear may revolve together, and said combustion engine, said motor-generator and said continuously variable transmission are controlled by said parallel hybrid mode control means.

5. The vehicular drive unit according to claim 2, further comprising parallel hybrid mode control means for controlling the torque of said motor-generator by one of adding and subtracting the torque to and from the output of said combustion engine, said combustion engine held in a predetermined state, so that the output required by the vehicle may be satisfied by changing the torque for a constant speed of said third rotary element, and for controlling the revolution ratio of said continuously variable transmission so that the revolution number of said third rotary element may take a predetermined value, wherein in medium and high speed ranges of the vehicle speed, said engagement means are so controlled that the first rotary element of said planetary gear and the output shaft of said combustion engine may be disconnected but that the output shaft of said combustion engine may be connected to said third rotary element, and said combustion engine, said motor-generator and said continuously variable transmission are controlled by said parallel hybrid mode control means.

6. The vehicular drive unit according to claim 4, wherein one of said power split and parallel hybrid mode control means controls said continuously variable transmission and said motor-generator so that the output of said combustion engine may change along a best mileage curve.

7. The vehicular drive unit according to claim 4, further comprising average compute means for computing an average output of the vehicle, wherein one of said power split and parallel control means controls said combustion engine so that the output of the vehicle may be the average output computed by said average compute means.

8. The vehicular drive unit according to claim 4, further comprising residue detecting means for detecting the residue of said battery, wherein when the residue detected by said residue detecting means is within a proper range, said parallel hybrid mode control means controls said motor-generator to supplement the output of said combustion engine if the output is lower than the vehicle output so that it is short, and to generate the electric power with an excess output if the combustion engine output is higher than the vehicle output.

9. The vehicular drive unit according to claim 4, further comprising residue detecting means for detecting the residue of said battery, wherein when the residue detected by said residue detecting means is small, said parallel hybrid mode control means controls the output of said combustion engine so that said motor-generator generates electric power.

10. The vehicular drive unit according to claim 4, further comprising residue detecting means for detecting the residue of said battery, wherein when the residue detected by said residue detecting means is large, said parallel hybrid mode control means controls the output of said combustion engine so that said motor-generator may generate the torque.

11. The vehicular drive unit according to claim 5, wherein one of said power split and parallel hybrid mode control means controls said continuously variable transmission and said motor-generator so that the output of said combustion engine may change along a best mileage curve.

12. The vehicular drive unit according to claim 5, further comprising average compute means for computing an average output of the vehicle, wherein one of said power split and parallel control means controls said combustion engine so that the output of the vehicle may be the average output computed by said average compute means.

13. The vehicular drive unit according to claim 5, further comprising residue detecting means for detecting the residue of said battery, wherein when the residue detected by said residue detecting means is within a proper range, said parallel hybrid mode control means controls said motor-generator to supplement the output of said combustion engine if the output is lower than the vehicle output so that it is short, and to generate the electric power with an excess output if the combustion engine output is higher than the vehicle output.

14. The vehicular drive unit according to claim 5, further comprising residue detecting means for detecting the residue of said battery, wherein when the residue detected by said residue detecting means is small, said parallel hybrid mode control means controls the output of said combustion engine so that said motor-generator generates electric power.

15. The vehicular drive unit according to claim 5, further comprising residue detecting means for detecting the residue of said battery, wherein when the residue detected by said residue detecting means is large, said parallel hybrid mode control means controls the output of said combustion engine so that said motor-generator may generate the torque.

16. The vehicular drive unit according to claim 1, further comprising mode select means for selecting from:

a motor mode, in which said engagement means is controlled to disconnect the output shaft of said combustion engine and said first rotary element and to rotate said planetary gear together so that the vehicle may be driven by said motor-generator;

a power split mode, in which said engagement means is controlled to rotate said first, second and third rotary elements of said planetary gear individually so that the vehicle may be driven by said combustion engine and said motor-generator;

a parallel hybrid mode, in which said engagement means is controlled to rotate the output shaft of said engine and said third rotary element together so that the vehicle may be driven by said combustion engine and said motor-generator; and an engine mode, in which said engagement means are controlled to connect the first rotary element and the third rotary element of said planetary gear so that the vehicle may be driven by said combustion engine.

17. The vehicular drive unit according to claim 10, further comprising residue detecting means for detecting the residue of the battery, wherein the select regions of the individual mode by said select means are changed according to the residue of said battery.

18. The vehicular drive unit according to claim 15, further comprising residue detecting means for detecting the residue of the battery, wherein the select regions of the individual mode by said select means are changed according to the residue of said battery.

19. The vehicular drive unit according to claim 1, further comprising:

reverse engagement means adapted to be controlled by forward/backward operation means; and reverse control means for causing said reverse engagement means to retain the first rotary element of said planetary gear and said engagement means to disconnect the output shaft of said combustion engine and said first rotary element thereby to output the revolution of said second rotary element by said motor-generator as a reverse revolution to said third rotary element.

20. The vehicular drive unit according to claim 1, further comprising:

deceleration detecting means for detecting deceleration of the vehicle; and regenerative braking control means for controlling said motor-generator to convert inertial energy of the vehicle into the electric energy on the basis of the output signal coming from said deceleration detecting means thereby to store the converted electrical energy in said battery.

21. The vehicular drive unit according to claim 1, wherein said continuously variable transmission is of the toroidal type.

22. The vehicular drive unit according to claim 1, wherein said continuously variable transmission is of the belt type.

23. The vehicular drive unit according to claim 1, wherein said planetary gear is a simple planetary gear, wherein said first rotary element is a ring gear, wherein said second rotary element is a sun gear, and wherein said third rotary element is a carrier.

24. The vehicular drive unit according to claim 1, wherein said planetary gear is a simple planetary gear, wherein said first rotary element is a sun gear, wherein said second rotary element is a ring gear, and wherein said third rotary element is a carrier.

25. The vehicular drive unit according to claim 1, wherein said planetary gear is a double-pinion planetary gear, wherein said first rotary element is a carrier, wherein said second rotary element is a sun gear, and wherein said third rotary element is a ring gear.

26. The vehicular drive unit according to claim 1, wherein said planetary gear is a double-pinion planetary gear, wherein said first rotary element is a sun gear, wherein said second rotary element is a carrier, and wherein said third rotary element is a ring gear.

* * * * *